(12) United States Patent
Lim

(10) Patent No.: US 11,961,214 B2
(45) Date of Patent: Apr. 16, 2024

(54) ELECTRONIC APPARATUS AND IMAGE PROCESSING METHOD THEREOF

(71) Applicant: SAMSUNG ELECTRONICS CO., LTD., Suwon-si (KR)

(72) Inventor: Hyungjun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 254 days.

(21) Appl. No.: 17/506,061

(22) Filed: Oct. 20, 2021

(65) Prior Publication Data
US 2022/0375048 A1   Nov. 24, 2022

Related U.S. Application Data

(63) Continuation of application No. PCT/KR2021/012633, filed on Sep. 15, 2021.

(30) Foreign Application Priority Data

May 24, 2021   (KR) .................. 10-2021-0066450

(51) Int. Cl.
*G06T 5/20*   (2006.01)
*G06F 3/14*   (2006.01)
(Continued)

(52) U.S. Cl.
CPC ............. *G06T 5/20* (2013.01); *G06F 3/1446* (2013.01); *G06T 3/40* (2013.01); *G06T 5/008* (2013.01);
(Continued)

(58) Field of Classification Search
CPC ... G06T 5/008; G06T 5/20; G06T 3/40; G06F 3/1446; G06V 10/30; G06V 10/462;
(Continued)

(56) References Cited

U.S. PATENT DOCUMENTS 5,598,217 A * 1/1997 Yamaguchi ............ H04N 19/59
                                                        375/E7.193
6,252,577 B1 * 6/2001 Rashkovskiy ........ G06T 3/4007
                                                        358/1.9
(Continued)

FOREIGN PATENT DOCUMENTS

CN      104658488     5/2015
JP       6352617      7/2018
(Continued)

OTHER PUBLICATIONS

Search Report and Written Opinion dated Feb. 15, 2022 in counterpart International Patent Application No. PCT/KR2021/012633.

*Primary Examiner* — Phi Hoang
(74) *Attorney, Agent, or Firm* — Nixon & Vanderhye P.C.

(57) ABSTRACT

An electronic apparatus is disclosed. The electronic apparatus includes: a memory storing an input image, and a processor configured to: apply a filter to the input image to identify the input image as a plurality of areas, apply a first low-frequency filter to a first area among the plurality of areas, and apply a second low-frequency filter to a second area among the plurality of areas to perform downscaling, wherein a cut-off frequency of the second low-frequency filter is configured to be higher than a cut-off frequency of the first low-frequency filter.

18 Claims, 39 Drawing Sheets

(51) Int. Cl.
*G06T 3/40* (2006.01)
*G06T 5/00* (2006.01)
*G06V 10/30* (2022.01)
*G09G 3/20* (2006.01)

(52) U.S. Cl.
CPC ............... *G06V 10/30* (2022.01); *G09G 3/20* (2013.01); *G09G 2340/0407* (2013.01)

(58) Field of Classification Search
CPC .... G06V 10/82; G09G 2340/02; G09G 5/005; G09G 3/20; G09G 2340/0407; G09G 2360/16; G09G 5/373
See application file for complete search history.

(56) References Cited

U.S. PATENT DOCUMENTS

| | | | |
|---|---|---|---|
| 6,600,519 B1 * | 7/2003 | Hwang | H04N 5/20 348/E5.073 |
| 6,768,514 B1 * | 7/2004 | Tsuchiya | H04N 5/20 348/E5.064 |
| 7,333,674 B2 | 2/2008 | Slavin | |
| 7,375,767 B2 | 5/2008 | Lee et al. | |
| 7,876,979 B2 | 1/2011 | Lee et al. | |
| 8,938,121 B2 | 1/2015 | Lee et al. | |
| 8,977,069 B2 | 3/2015 | Hwang et al. | |
| 10,817,990 B1 | 10/2020 | Yang et al. | |
| 10,825,140 B1 | 11/2020 | Yang et al. | |
| 11,051,021 B2 | 6/2021 | Aono et al. | |
| 11,195,261 B2 | 12/2021 | Nam et al. | |
| 2005/0285974 A1 | 12/2005 | Kim | |
| 2006/0033936 A1 | 2/2006 | Lee et al. | |
| 2006/0125842 A1 | 6/2006 | Kim et al. | |
| 2011/0018877 A1 | 1/2011 | Hwang et al. | |
| 2014/0153823 A1 | 6/2014 | Lee et al. | |
| 2016/0072980 A1 * | 3/2016 | Göktekin | H04N 1/32309 358/2.1 |
| 2020/0058113 A1 | 2/2020 | Nam et al. | |
| 2020/0226822 A1 | 7/2020 | Sundaram et al. | |
| 2022/0254317 A1 * | 8/2022 | Hochman | G09G 5/42 |

FOREIGN PATENT DOCUMENTS

| | | | | |
|---|---|---|---|---|
| JP | 2021-005741 | | 1/2021 | |
| KR | 10-0519776 | | 10/2005 | |
| KR | 10-0555866 | | 3/2006 | |
| KR | 10-0648308 | | 11/2006 | |
| KR | 10-0698626 | | 3/2007 | |
| KR | 10-0881698 | | 2/2009 | |
| KR | 10-1590765 | | 2/2016 | |
| KR | 10-2018-0051772 | | 5/2018 | |
| KR | 10-2020-0140096 | | 12/2020 | |
| WO | WO 2021/081512 | * | 4/2021 | ............... G06F 3/14 |

* cited by examiner

< Low-pas filter (N=100, cut-off frequency = π/4) >

< Low-pas filter (N=12, cut-off frequency = $\pi/2$) >

< Low-pas filter (N=12, cut-off frequency = $\pi/3$) >

< Low-pas filter (N=12, cut-off frequency = $\pi/3$) >

ELECTRONIC APPARATUS AND IMAGE PROCESSING METHOD THEREOF

CROSS-REFERENCE TO RELATED APPLICATION(S)

This application is a bypass continuation of International Application No. PCT/KR2021/012633, filed on Sep. 15, 2021, which is based on and claims priority to Korean Patent Application No. 10-2021-0066450, filed on May 24, 2021, in the Korean Intellectual Property Office, the disclosures of which are incorporated by reference herein in their entireties.

BACKGROUND

1. Field

The disclosure relates to electronic apparatus and an imaging processing method. For example, the disclosure relates to an electronic apparatus for downscaling an input image and an image processing method thereof.

2. Description of the Related Art

With the development of an electronic technology, various types of electronic products have been developed and widely distributed. Display devices used in various places such as a home, an office, and a public place have been continuously developed over the past several years.

Recently, a demand for a high-resolution image service has increased significantly. Accordingly, images provided by content providers such as broadcasters are gradually becoming high-definition. However, as displays such as TVs, video walls, or the like have various resolutions, a need for downscaling high-resolution images is gradually increasing.

Existing downscaling methods include subsampling, bilateral interpolation, bicubic interpolation, or the like which extract only specific pixels from an input image. However, in the case of these methods, there was a problem in that aliasing and sharpness were deteriorated.

SUMMARY

Embodiments of the disclosure provide an electronic apparatus for downscaling an image using different low-frequency filters by detecting presence or absence of a pattern for each area in an input image, and an image processing method thereof.

Embodiments of the disclosure provide an electronic apparatus for downscaling an image using different low-frequency filters by detecting presence or absence of a pattern for each area in an input image, and an image processing method thereof.

According to an example embodiment of the disclosure, an electronic apparatus includes: a memory storing an input image, and a processor configured to: apply a filter to the input image to identify the input image as a plurality of areas, apply a first low-frequency filter to a first area among the plurality of areas, and apply a second low-frequency filter to a second area among the plurality of areas to perform downscaling, wherein a cut-off frequency of the second low-frequency filter is higher than a cut-off frequency of the first low-frequency filter.

The filter may include a first pattern filter configured to detect a first type pattern and a second pattern filter configured to detect a second type pattern, and wherein the processor is configured to: identify the input image as a plurality of areas based on a first output value acquired by applying the first pattern filter to the input image and a second output value acquired by applying the second pattern filter to the input image.

The processor may be configured to: based on a sum of the first output value and the second output value, identify the input image as the first area in which a pattern inclusion probability is greater than or equal to a threshold value, and the second area in which the pattern inclusion probability is less than the threshold value.

The processor may be configured to: based on the first output value and the second output value, identify the input image as a third area in which an inclusion probability of the first type is greater than or equal to the threshold value, a fourth area in which an inclusion probability of the second type is greater than or equal to the threshold value, and a fifth area in which a pattern inclusion probability is less than the threshold value, apply the first low-frequency filter to the third area, apply the second low-frequency filter to the fifth area, and apply a third low-frequency filter to remove a high-frequency component greater than or equal to a third threshold frequency to the fourth area, wherein a cut-off frequency of the third low-frequency filter is higher than the cut-off frequency of the first low-frequency filter and lower than the cut-off frequency of the second low-frequency filter.

A pattern period corresponding to the second type pattern may be greater than a pattern period corresponding to the first type pattern.

At least one of the cut-off frequency of the first low-frequency filter and the cut-off frequency of the second low-frequency filter may be determined based on a downscaling ratio with respect to the input image.

The processor may be configured to: apply the first low-frequency filter to the input image to acquire a downscaled first image, apply the second low-frequency filter to the input image to acquire a downscaled second image, apply a filter for pattern detection to the input image to acquire a weight value for identifying the plurality of areas, and apply the acquired weight value to the downscaled first image and apply another weight value acquired based on the acquired weight value to the downscaled second image to acquire the downscaled image.

The processor may be configured to: apply a plurality of filters configured to detect a plurality of type patterns to the input image to acquire a plurality of output values, and sum the plurality of output values and normalize to acquire the weight value.

The acquired weight value may have a value of $0 \leq w \leq 1$, and the another weight value may be calculated as $1-w$.

The processor may be configured to: apply the first low-frequency filter to the input image to acquire the downscaled first image, apply the second low-frequency filter to the input image to acquire the downscaled second image, apply the third low-frequency filter to the input image to acquire a downscaled third image, apply the filter for pattern detection to the input image to acquire a first weight value, a second weight value, and a third weight value for identifying the plurality of areas, and apply the first weight value to the downscaled first image, apply the second weight value to the downscaled second image, and the third weight value to the downscaled third image to acquire the downscaled image.

A sum of the first weight, the second weight, and the third weight may be 1.

The apparatus may further include a display, wherein the processor is configured to control the display to display the downscaled image.

The display may comprise a plurality of display modules.

According to an example embodiment of the disclosure, method of image processing by an electronic apparatus may include: applying a filter to an input image to identify the input image as a plurality of areas, applying a first low-frequency filter to a first area among the plurality of areas, applying a second low-frequency filter to a second area among the plurality of areas to perform downscaling, and displaying the downscaled image, wherein a cut-off frequency of the second low-frequency filter is higher than a cut-off frequency of the first low-frequency filter.

The filter may include a first pattern filter configured to detect a first type pattern and a second pattern filter configured to detect a second type pattern, and wherein the identifying the input image as the plurality of areas includes: identifying the input image as a plurality of areas based on a first output value acquired by applying the first pattern filter to the input image and a second output value acquired by applying the second pattern filter to the input image.

The identifying the input image as a plurality of areas may include: based on a sum of the first output value and the second output value, identifying the input image as the first area in which a pattern inclusion probability is greater than or equal to a threshold value, and identifying the input image as the second area in which the pattern inclusion probability is less than the threshold value.

The identifying the input image as the plurality of areas may include: based on the first output value and the second output value, identifying the input image as a third area in which an inclusion probability of the first type is greater than or equal to the threshold value, a fourth area in which an inclusion probability of the second type is greater than or equal to the threshold value, and a fifth area in which a pattern inclusion probability is less than the threshold value, applying the first low-frequency filter to the third area, applying the second low-frequency filter to the fifth area, and applying a third low-frequency filter to remove a high-frequency component greater than or equal to a third threshold frequency to the fourth area, wherein a cut-off frequency of the third low-frequency filter is higher than the cut-off frequency of the first low-frequency filter and lower than the cut-off frequency of the second low-frequency filter.

A pattern period corresponding to the second type pattern may be greater than a pattern period corresponding to the first type pattern.

At least one of the cut-off frequency of the first low-frequency filter and the cut-off frequency of the second low-frequency filter may be determined based on a downscaling ratio with respect to the input image.

According to an example embodiment of the disclosure, a non-transitory computer-readable medium storing computer instructions that, when executed by a processor of an electronic device, cause the electronic apparatus to perform an operation comprising: applying a filter to an input image to identify the input image as a plurality of areas, applying a first low-frequency filter to a first area among the plurality of areas, applying a second low-frequency filter to a second area among the plurality of areas to perform downscaling, and control a display to display the downscaled image, wherein a cut-off frequency of the second low-frequency filter is higher than a cut-off frequency of the first low-frequency filter.

DETAILED DESCRIPTION

Hereinafter, the disclosure will be described in greater detail with reference to the accompanying drawings.

The terms used in example embodiments will be briefly explained, and various example embodiments will be described in greater detail with reference to the accompanying drawings.

Terms used in the disclosure are selected as general terms currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The terms such as "first," "second," and so on may be used to describe a variety of elements, but the elements should not be limited by these terms. The terms used herein are merely intended to explain various example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The term "at least one of A or B" is to be understood as indicating either "A" or "B" or "A and B".

In the disclosure, a 'module' or a 'unit' may perform at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below in a manner that will be understood by one of ordinary skill in the art. However, various example embodiments may be realized in a variety of different configurations, and are not limited to descriptions provided herein. Also, well-known functions or constructions may not be described in detail where they would obscure the disclosure with unnecessary detail.

FIGS. 1A, 1B, 1C and 1D are diagrams illustrating an example implementation of an electronic apparatus according to various embodiments.

Figure 1A:
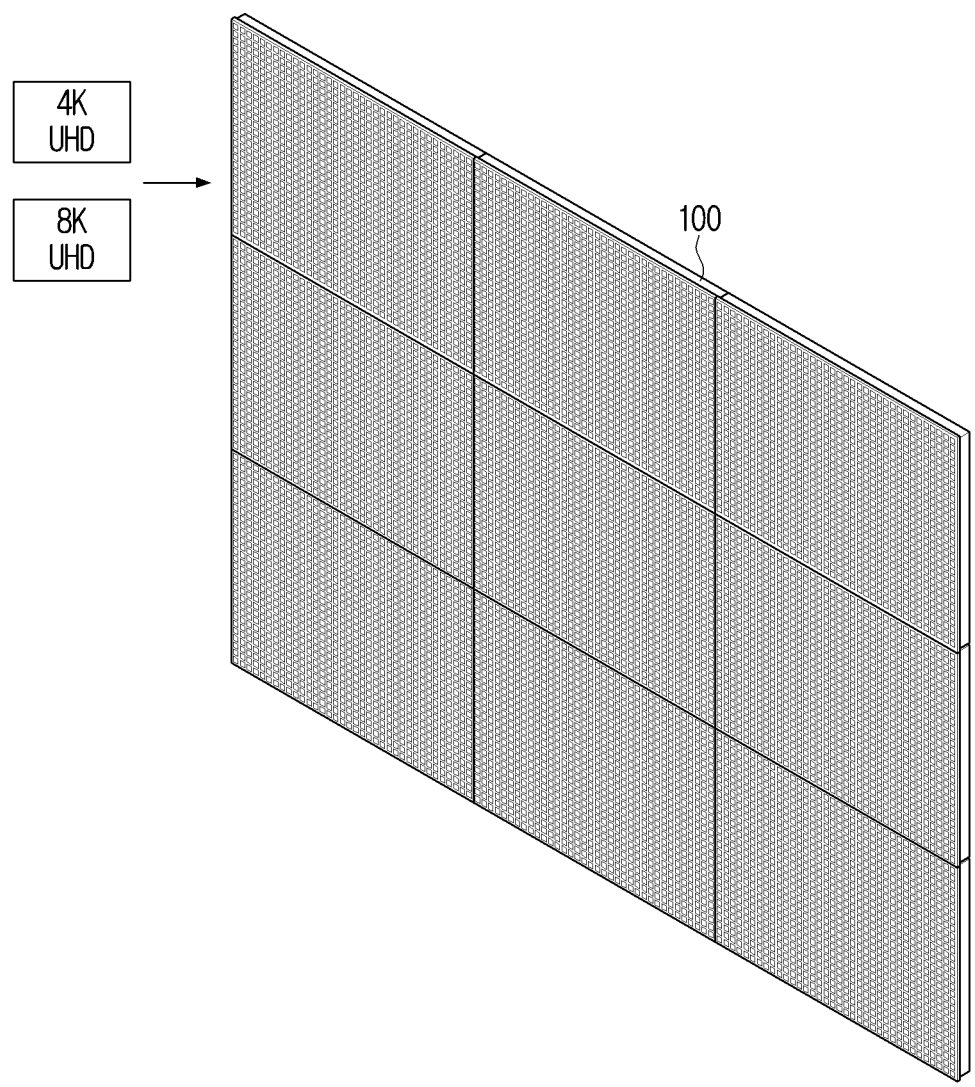
FIGS. 1A, 1B, 1C and 1D are diagrams illustrating an example implementation of an electronic apparatus according to various embodiments.

The electronic apparatus 100 may be implemented, for example, as a TV as shown in FIG. 1A, but is not limited thereto, and apparatuses such as, for example, a set-top box, a large format display (LFD), a digital signage, a digital information display (DID), video wall, projector display, smartphone, tablet PC, notebook PC, head mounted display (HMD), near eye display (NED), camera, camcorder, printer, or the like may apply without limitation.

The electronic apparatus 100 may receive various compressed images or images of various resolutions. For example, the electronic apparatus 100 may receive an image in a compressed form such as a moving picture experts group (MPEG) (e.g., MP2, MP4, MP7, etc.), a joint photographic coding experts group (JPEG), advanced video coding (AVC), H.264, H.265, high efficiency video codec (HEVC), or the like. The electronic apparatus 100 may receive any one of standard definition (SD), high definition (HD), full HD, 4K UHD (Ultra HD), 8K UHD (Ultra HD), or higher resolution images, but is not limited thereto.

According to an example, even if the electronic apparatus 100 receives an 8K UHD resolution image, if a display provided in the electronic apparatus 100 does not support the 8K UHD resolution, there may be a case in which the received image needs to be downscaled. For example, when the electronic apparatus 100 is implemented as a video wall device including a plurality of display modules, a desired number of display modules may be combined to implement a 4K UHD or Full HD display.

Figure 1B:
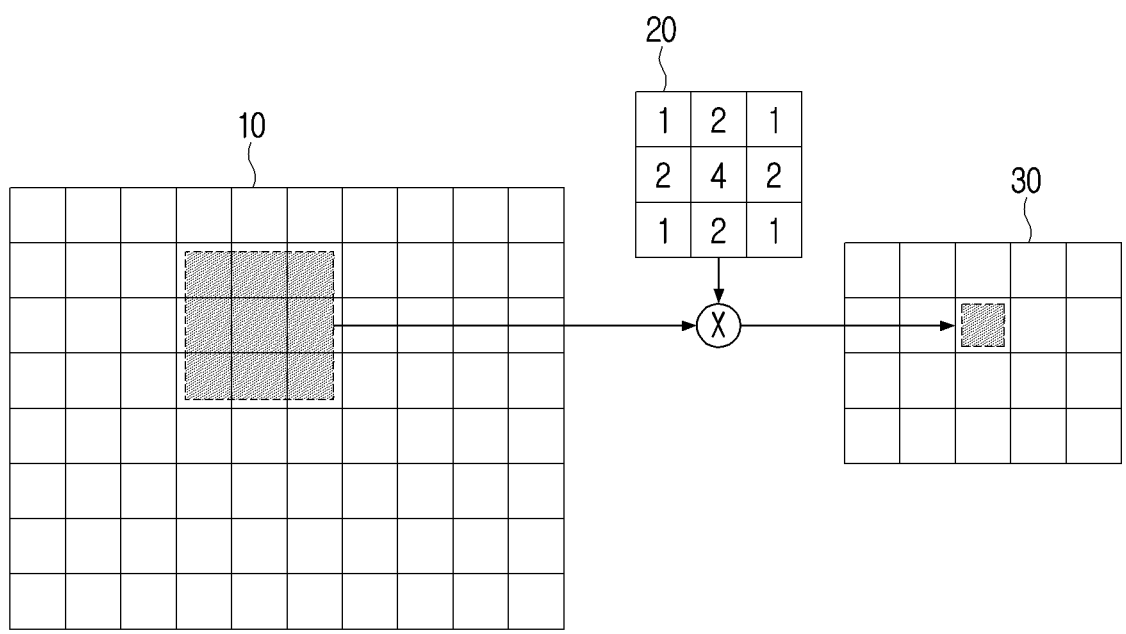

In this case, the electronic apparatus 100 may downscale the received image using a low-frequency filter. Using the low-frequency filter may prevent and/or reduce aliasing generated in a process of downscaling (or reducing an image) of an image. Aliasing may refer to a phenomenon in which details appear distorted when an image with fine details is excessively reduced. For example, as shown in FIG. 1B, a downscaled image 30 may be acquired by applying the low-frequency filter 20 to an input image 10. FIG. 1B shows a process of downscaling a size of an input image by 1/2 according to an example, and an output image 30 is acquired based on an output pixel value acquired by applying the low-frequency filter 20 to pixel areas in the input image 10. However, even when the input image is downscaled by an arbitrary ratio such as 2/3 and 4/5 rather than downscaling the input image by an integer reciprocal ratio such as 1/2, 1/3, or 1/4, neighboring pixels are may be used to obtain an output pixel value at a decimal point.

Figure 1C:
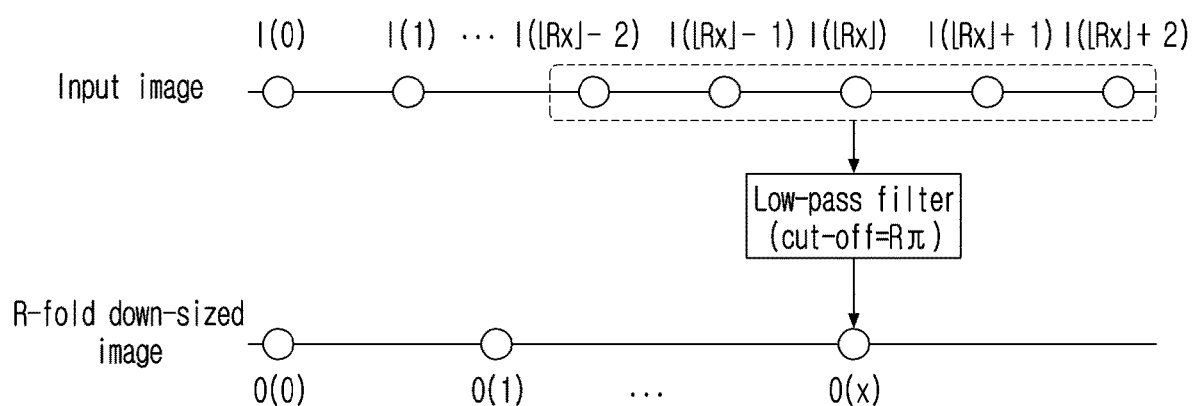

FIG. 1C is a diagram illustrating an example process of downscaling a size of the input image 10 by 1/2 using a low-frequency filter in one dimension. For example, when downscaling a 2D image with $W_{in}$ pixels horizontally and $H_{in}$ pixels vertically to an output image of $W_{out}H_{out}$ size, a horizontal inter-sample distance may increase from $1/W_{in}$ to $1/W_{out}$, and a vertical inter-sample distance may be changed from $1/H_{in}$ to $1/H_{out}$. Accordingly, a position of the input image corresponding to (x,y)th pixel of the output image becomes $((W_{in}/W_{out})x, (H_{in}/H_{out})y)$.

Figure 1D:
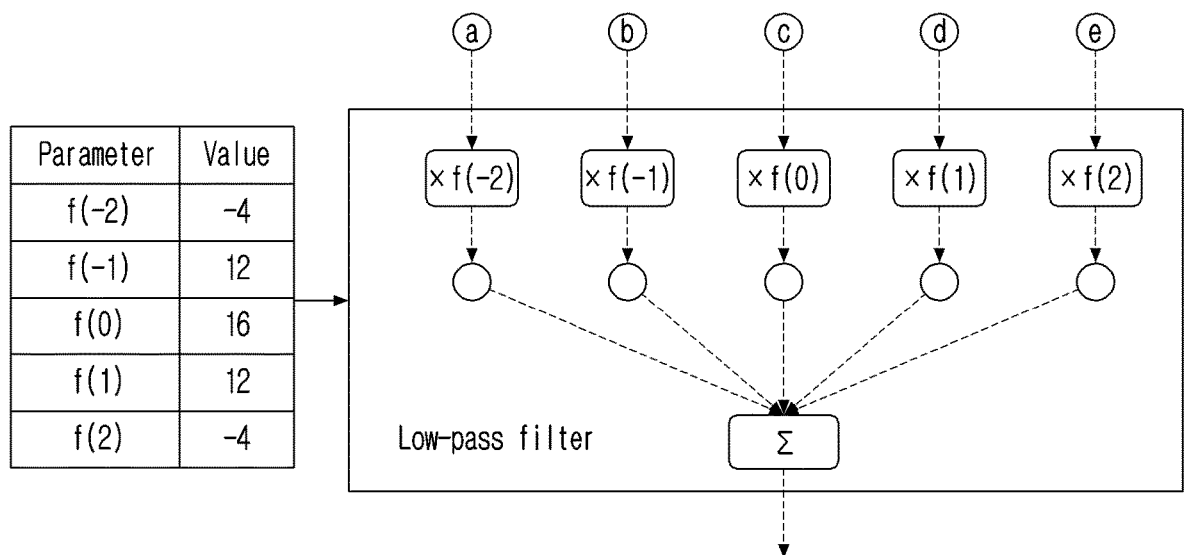

FIG. 1D is a diagram illustrating an example low-frequency filtering process. In the low-frequency filtering, each of a plurality of input values (a, b, c, d, e) is multiplied by a specific weight (filter coefficient), and a value acquired by adding the multiplied values may be output. Accordingly, the downscaling process of an image using low-frequency filtering may be expressed, by way of non-limiting example, as Equation 1 below.

$$O(x) = \Sigma n =_{-N/2-N/2} f_R(n) * I(\lfloor rx \rfloor + n) \qquad \text{[Equation 1]}$$

Here, $f_R$ denotes a low-frequency filter, and R denotes a ratio between 0 and 1 at which an image is downscaled. In other words, $R=W_{out}/W_{in}$ when horizontally downscaling a 2D image and $R=H_{out}/H_{in}$ when vertically downscaling the 2D image. N denotes a size of a filter (the number of samples of the filter). Coefficients of the low-frequency filter may be previously calculated values and may be stored in a memory in the form of a look-up table (LUT) or input from the outside. The sum of the coefficients of the low-frequency filter is 1, and in the case of hardware in which a decimal point is difficult to be implemented, an integer value is used instead as shown in FIG. 1D, and a method of dividing by the sum of the coefficients may be used. Here, $\lfloor x \rfloor$ may refer to the largest integer smaller than x.

Figure 2A:
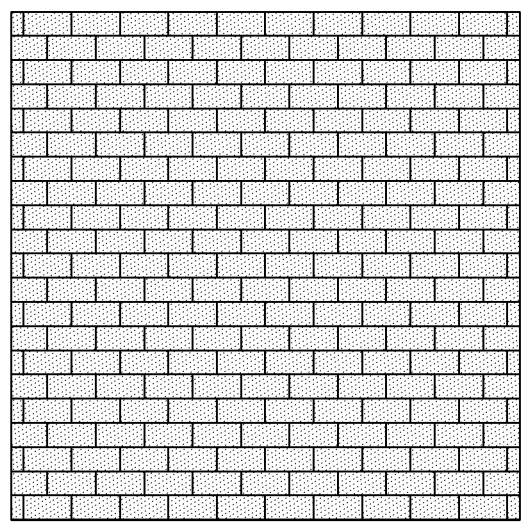
FIGS. 2A, 2B and 2C are diagrams illustrating an example difference in an output image depending on whether a low-frequency filter is used when reducing an image, according to various embodiments.
Figure 2B:
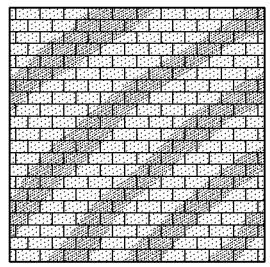
Figure 2C:
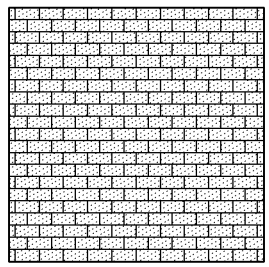

FIGS. 2A, 2B and 2C are diagrams illustrating a difference in an output image depending on whether a low-frequency filter is used according to various embodiments.

As for FIGS. 2A, 2B and 2C, for convenience of description, it is assumed by way of non-limiting example that an input image including 240×240 pixels is downscaled by a magnification of ¼. FIG. 2A shows an input image, FIG. 2B shows a case in which a low-frequency filter is not used, and FIG. 2C shows a case in which a low-frequency filter is used.

As shown in FIG. 2B, when an image is downscaled without using the low-frequency filter, diagonal wavy patterns, for example, aliasing, may be generated. However, as shown in FIG. 2C, when the image is downscaled using the low-frequency filter, aliasing may not be generated. The aliasing may appear in different forms depending on a detail form of the input image and a downscaling ratio of the image. Generally, as a detail of the input image is finer or the image is reduced to a smaller size, the aliasing may become more severe. In order to prevent and/or reduce aliasing, a high-frequency component of the input image may be removed with a low-frequency filter. For example, when the input image is reduced by R times, only low frequencies in a (0~Rπ) range are maintained (or passed) among the entire frequency range (0~π) of (0<R<1) input image, and all high-frequency components in the range of (Rπ~π) should be removed. Such a low-frequency filter may be referred to as a low-frequency filter with a cut-off frequency of Rπ, and may also be referred to as an anti-aliasing filter because it prevents and/or reduces aliasing. The most commonly used low-frequency filter is a sinc function. Equation 2 below shows a definition of a sinc function having a cut-off frequency of Rπ.

$$fR(x)=\text{sinc}(R_x)=\sin(R_{\pi x})/(R_{\pi x}) \quad \text{[Equation 2]}$$

Here, when x is 0, it may be defined as $f_R(0)=1$.

Figure 3A:
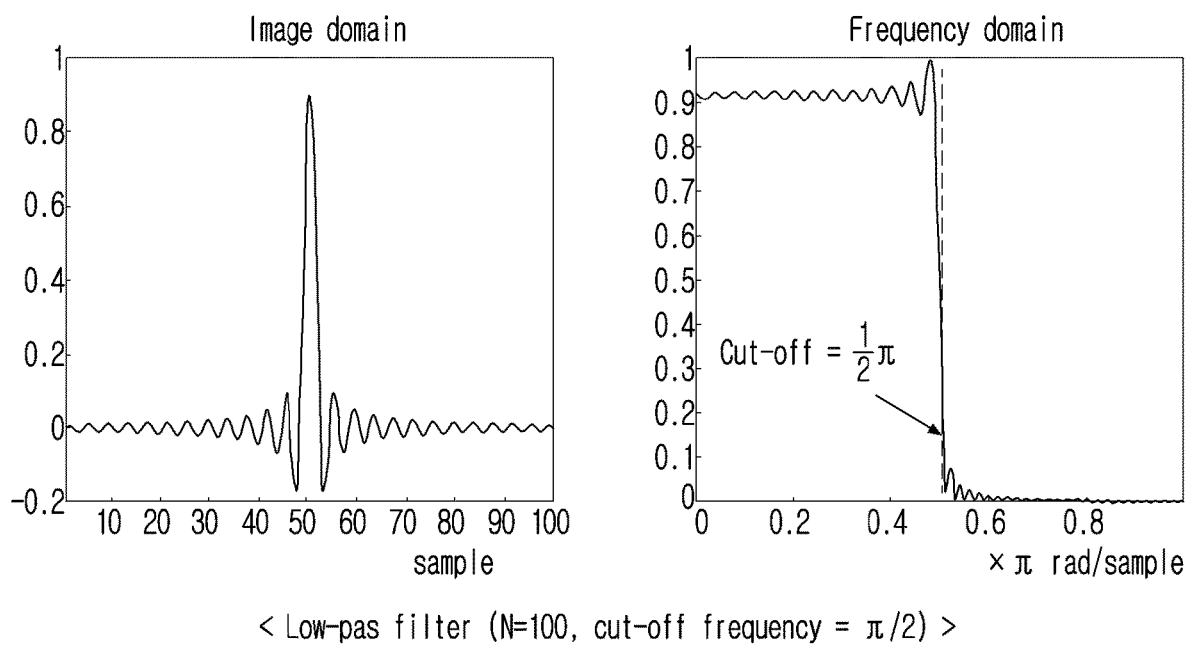
FIGS. 3A, 3B and 3C are graphs illustrating an example shape of a low-frequency filter according to various embodiments.
Figure 3B:
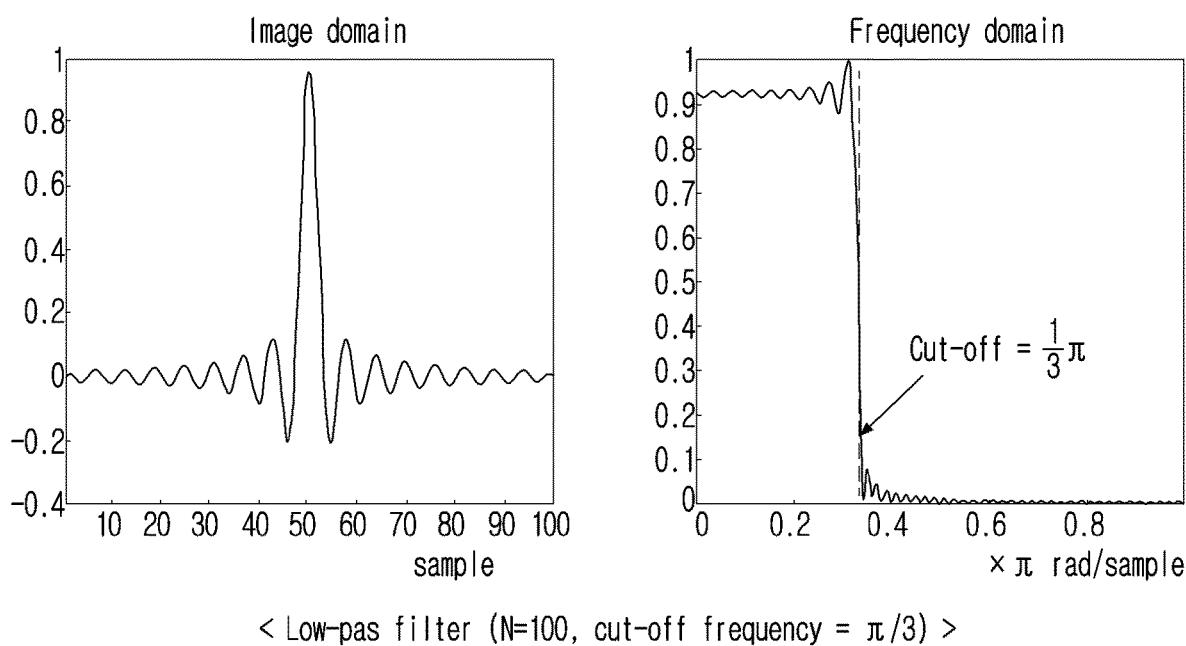
Figure 3C:
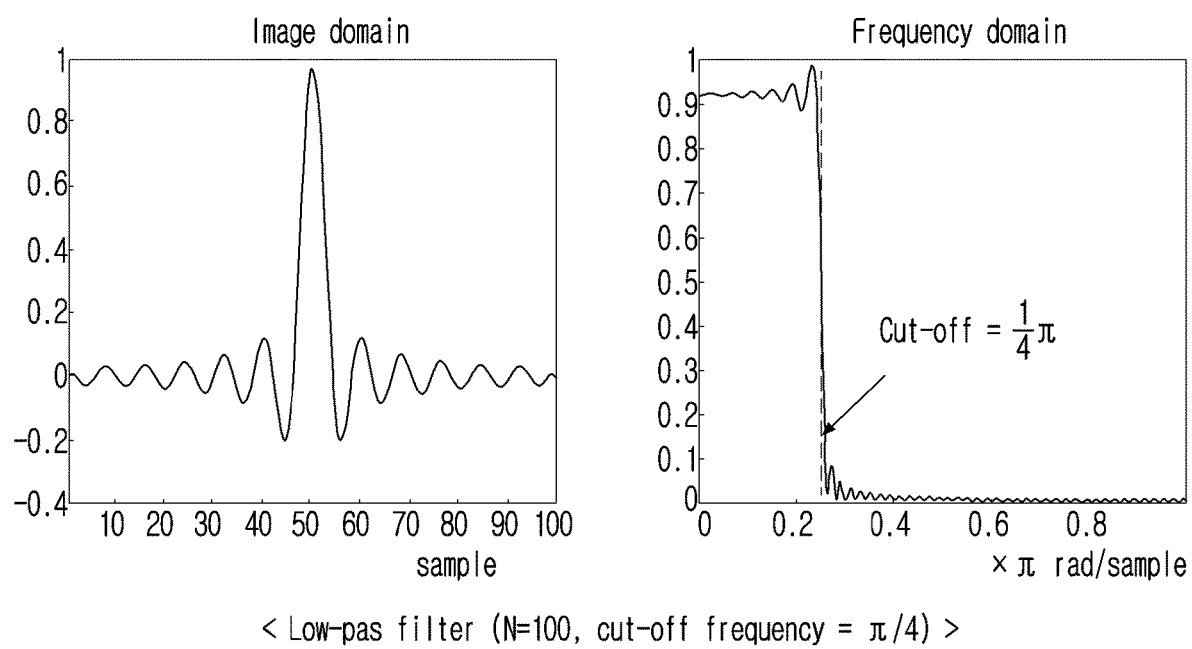

FIGS. 3A, 3B and 3C are graphs illustrating example shapes of a low-frequency filter according to various embodiments.

FIGS. 3A, 3B and 3C respectively show shapes in an area and a frequency area of a low-frequency filter having cut-off frequencies of π/2, π/3 and π/4. Each filter in the area has a wider shape as the cut-off frequency is smaller, that is, the smaller the image needs to be reduced, the more blur the image. In addition, each filter in the frequency area has a value close to 1 in a frequency area lower than the cut-off frequency and has a value close to 0 in a frequency area higher than the cut-off frequency.

In order to use the low-frequency filter, since several input pixels must be used simultaneously, a memory and operation logic for storing input pixels may be required. However, as the size of the filter (N) increases, memory and logic increase, and thus, the filter size is reduced to reduce cost, thereby reducing a performance of the filter. In other words, when a low-frequency filter is used, a problem may occur as the size of the low-frequency filter, that is, the number of parameters of the filter decreases.

Figure 4A:
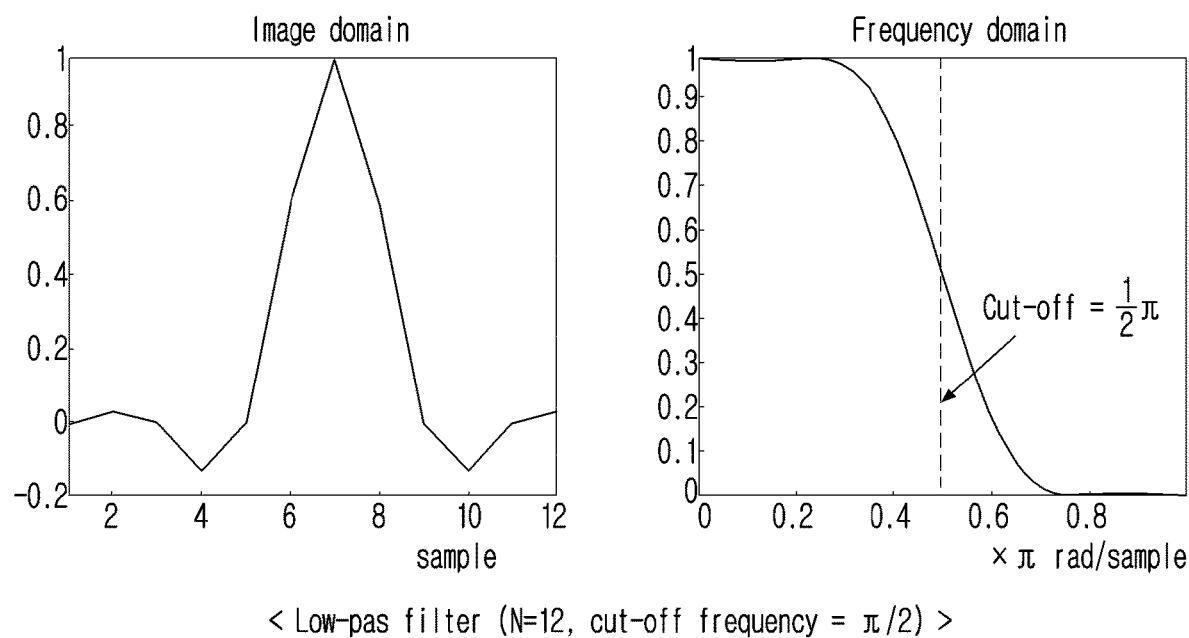
FIGS. 4A, 4B and 4C are graphs illustrating an example change in a filter that appears when a size of a filter is reduced according to various embodiments.
Figure 4B:
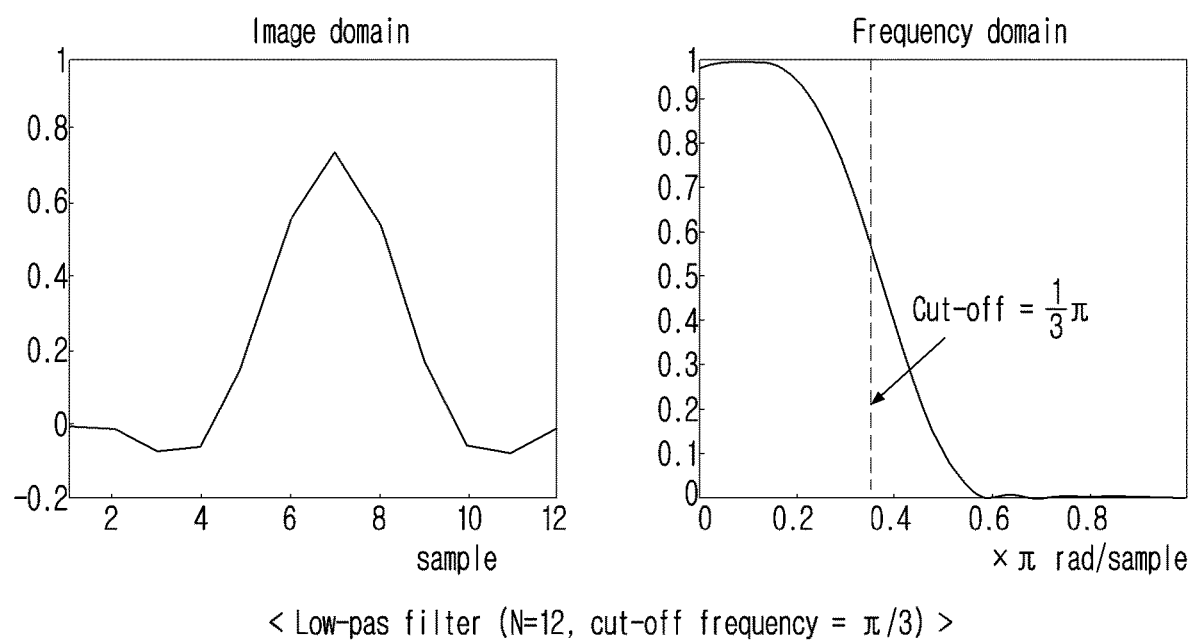
Figure 4C:
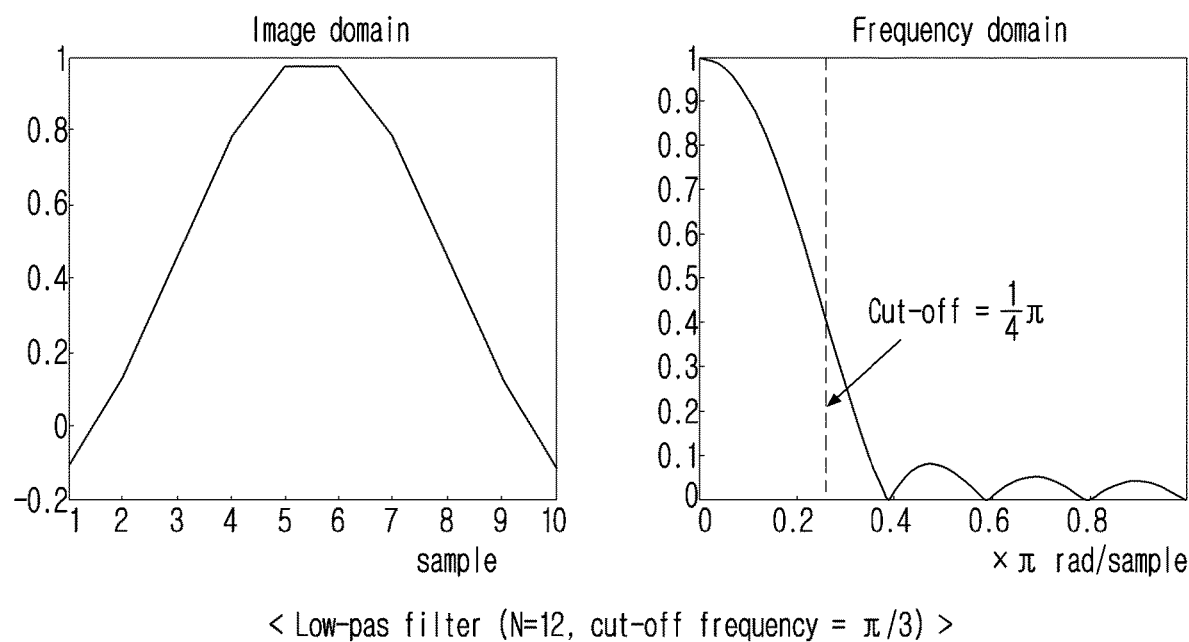

FIGS. 4A, 4B and 4C are graphs illustrating an example change in a filter that appears when a size of a filter is reduced. For example, FIGS. 3A, 3B and 3C may indicate a filter having a size of 100, and FIGS. 4A, 4B and 4C may indicate a low-frequency filter having a size of 10. Comparing a shape of a frequency area, a cut-off frequency slowly changes from 1 to 0 as the size of the filter becomes smaller. This frequency characteristic may refer, for example, to the low-frequency filter not removing all areas higher than the cut-off frequency.

Figure 5A:
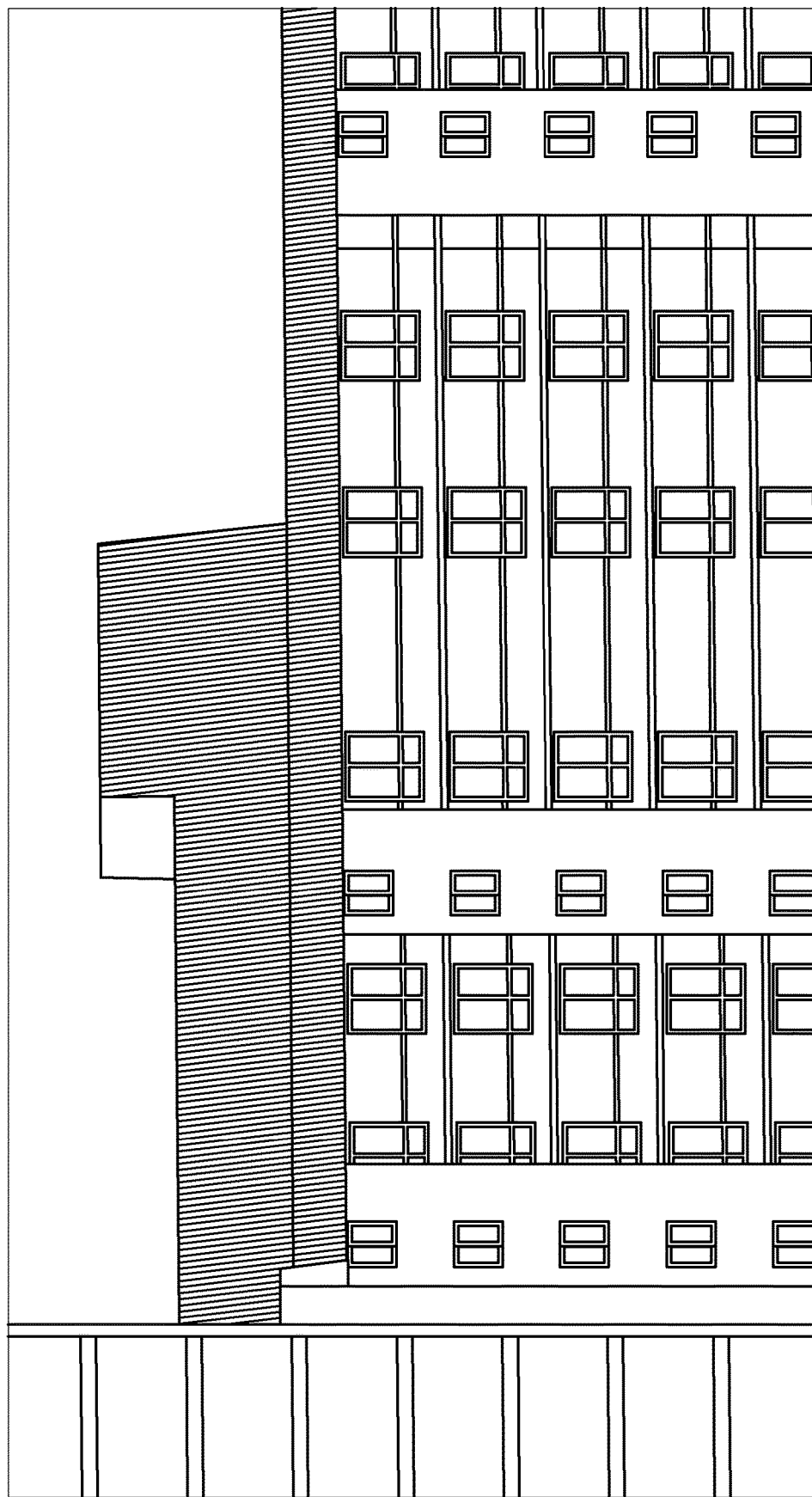
FIGS. 5A, 5B and 5C are diagrams illustrating an example problem that occurs when a small low-frequency filter is used.
Figure 5B:
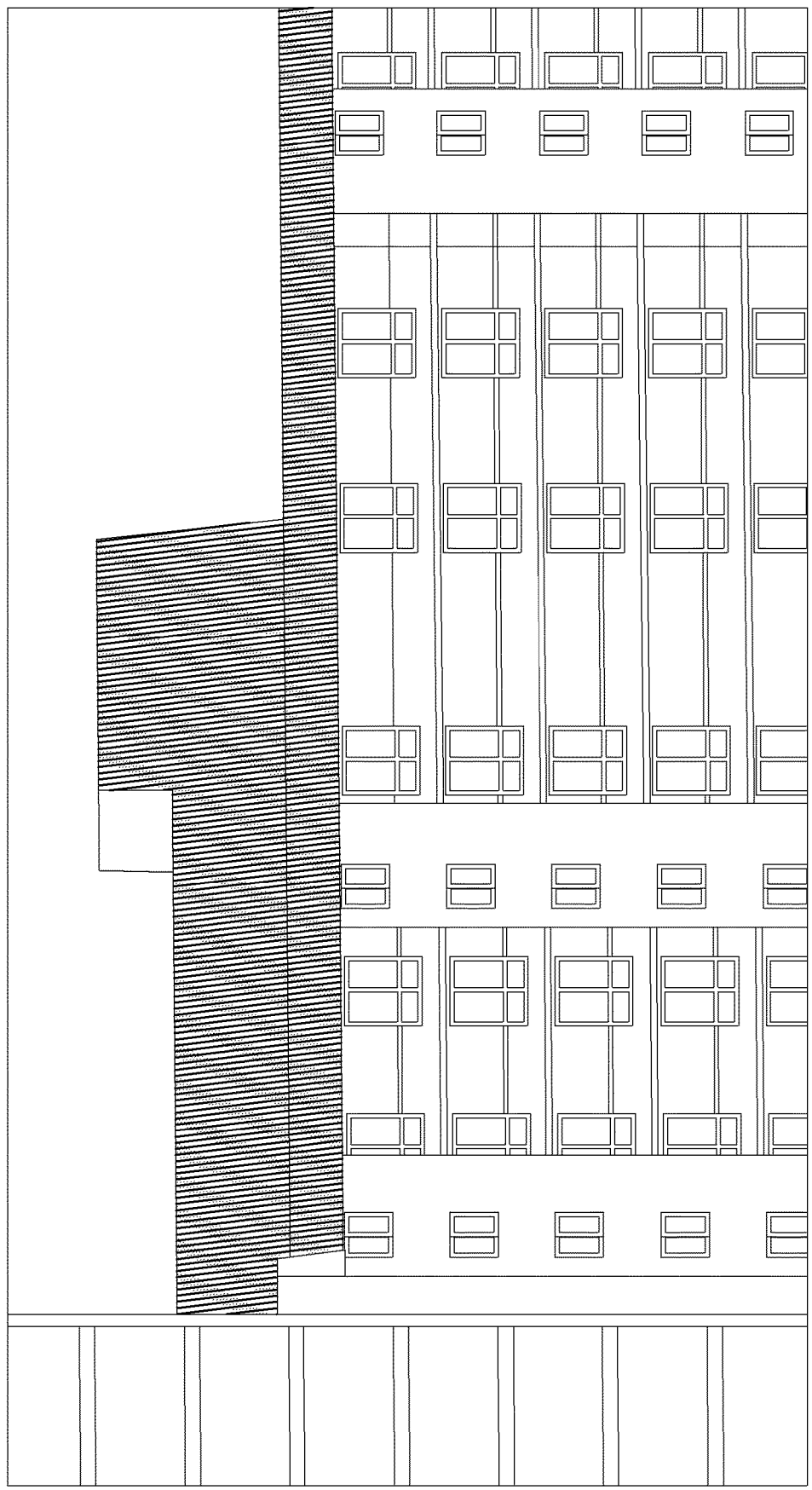

FIGS. 5A, 5B and to 5C are diagrams illustrating a problem that occurs when a small low-frequency filter is used.

Figure 5C:
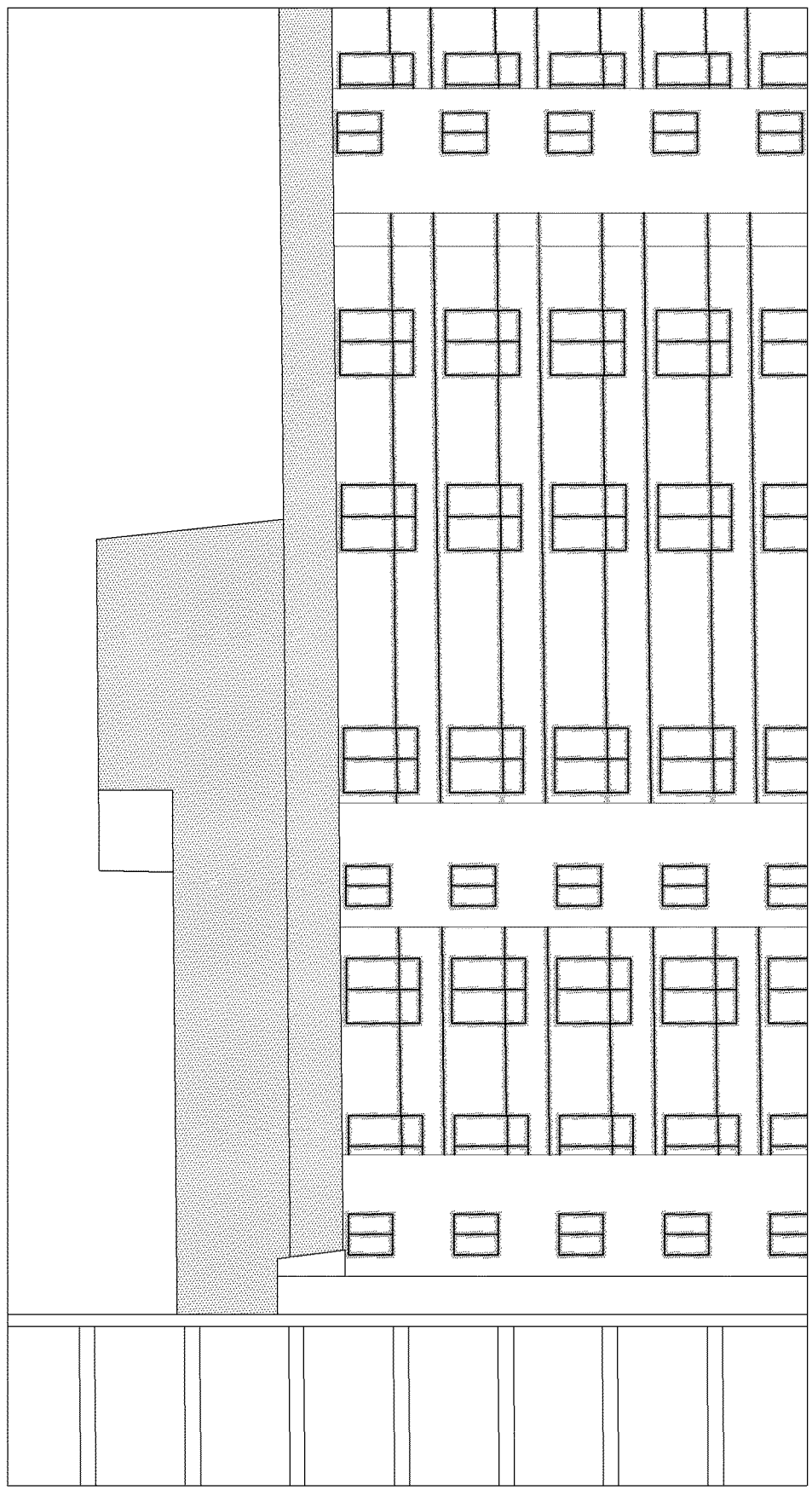

FIG. 5A shows an input image, and FIGS. 5B and 5C show images acquired by downscaling the input image by 1/3 using a low-frequency filter having a size of 12.

FIG. 5B is a result of using a low-frequency filter having a cut-off frequency of π/3 according to the theory described above. In this case, high-frequency distortion, e.g., aliasing, is generated in a different form from an input image in a roof part of a building. This is because a lot of high frequencies exist in areas where a certain pattern is repeated, such as the roof part, and when a small-sized low-frequency is used in such a pattern area, high frequencies are not sufficiently removed and aliasing occurs.

FIG. 5C is a result of using a low-frequency filter having a cut-off frequency of π/4, that is, a lower frequency than a theoretically required cut-off frequency, in order to address the problem described in FIG. 5B. In this case, as compared with FIG. 5B, although aliasing in the roof (pattern area) is not relatively generated, a sharpness in a non-pattern area is relatively reduced. This is because a frequency component of a band lower than the cut-off frequency is removed, that is, because a high frequency is removed more than necessary, the image is blurred. In other words, if a size of the low-frequency filter is reduced depending on limited resources (memory size), aliasing distortion may occur in an image having the repeating pattern. Accordingly, when a low-frequency filter having a lower bandwidth is used, aliasing of the pattern area may be prevented and/or reduced, but there is a problem in that detail in other areas may be lost.

Accordingly, various embodiments in which aliasing may be prevented and/or reduced while maintaining as much image detail as possible by detecting presence or absence of a pattern for each area of an image and applying different low-frequency filters to each area will be described below.

Figure 6:
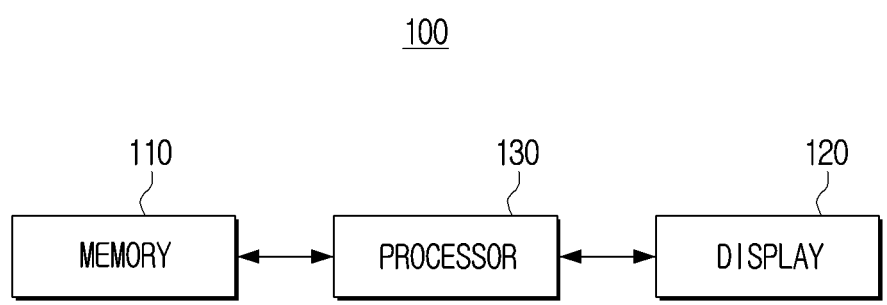
FIG. 6 is a block diagram illustrating an example configuration of an electronic apparatus according to various embodiments.

FIG. 6 is a block diagram illustrating an example configuration of an electronic apparatus according to various embodiments.

Referring to FIG. 6, a display apparatus 100 includes a display 110, a memory 120, and a processor (e.g., including processing circuitry) 130.

The display 110 may be implemented as a display including a self-luminescence element or a display including a non-self-luminescence element and a backlight. For example, it may be implemented as a display with various forms such as, for example, and without limitation, liquid crystal display (LCD), organic light emitting diodes (OLED) display, light emitting diodes (LED), plasma display panel (PDP), quantum dot light-emitting diodes (QLED), or the like. The display 160 may include a driving circuit, a backlight unit, or the like which may be implemented in forms such as, for example, and without limitation, an a-si TFT, a low temperature poly silicon (LTPS) TFT, an organic TFT (OTFT), or the like. On the other hand, the display 110 may be implemented as a touch screen combined with a touch sensor, a flexible display, a rollable display, a three-dimensional display (3D display), a display in which a plurality of display modules are physically connected, or the like. The processor 130 may include various processing circuitry and control the display 110 to output an output image processed according to various embodiments of the disclosure.

The memory 120 may be electrically connected to the processor 130 and may store data necessary for various embodiments of the disclosure. The memory 120 may be implemented in the form of a memory embedded in the electronic apparatus 100 or may be implemented in the form of a memory that is detachable from the electronic apparatus 100 according to a purpose of data storage. For example, data for driving the electronic apparatus 100 may be stored in a memory embedded in the electronic apparatus 100, and data for an extended function of the electronic apparatus 100 may be stored in the memory detachable from the electronic apparatus 100. The memory embedded in the electronic apparatus 100 may be implemented as at least one of a volatile memory (e.g., dynamic RAM (DRAM), static RAM (SRAM), or synchronous dynamic RAM (SDRAM), etc.), non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash, etc.), a hard drive, or a solid state drive (SSD), etc. In addition, the memory detachable to the electronic apparatus 100 may be implemented in a form such as a memory card (e.g., a compact flash (CF), secure digital (SD), micro secure digital (Micro-SD), mini secure digital (Mini-SD), extreme digital (xD), multi-media card (MMC), etc.), external memory that can be connected to a USB port (e.g., USB memory), or the like.

According to an example, the memory 120 may store at least one instruction for controlling the electronic apparatus 100 or a computer program including the instructions.

According to another example, the memory 120 may store an image received from an external device (e.g., a source device), an external storage medium (e.g., USB), an external server (e.g., a web hard drive), that is, an input image. Here, the image may be a digital moving image, but is not limited thereto.

According to another example, the memory 120 may store various information necessary for image quality processing, for example, information for performing at least one of, for example, and without limitation, Noise Reduction, Detail Enhancement, Tone Mapping, Contrast Enhancement, Color Enhancement, or Frame rate Conversion, information, algorithms, quality parameters, or the like. The memory 120 may store a final output image generated by image processing.

According to an embodiment, the memory 120 may be implemented as a single memory that stores data generated in various operations according to the disclosure. However, according to an embodiment, the memory 120 may be implemented to include a plurality of memories each storing different types of data or each storing data generated in different steps.

In the embodiment described above, it has been described that various data are stored in the external memory 120 of the processor 130, but at least some of the above-described data may be stored in the electronic apparatus 100 or an internal memory of the processor 130 according to at least one implementation example.

The processor 130 may be electrically connected to the memory 120 and may include various processing circuitry to control overall operations of the electronic apparatus 100. The processor 130 may include one or a plurality of processors. For example, the processor 130 may perform the operation of the electronic apparatus 100 according to various embodiments of the disclosure by executing at least one instruction stored in the memory 120.

According to an embodiment, the processor 130 may be implemented, for example, and without limitation, as a digital signal processor (DSP) for processing a digital image signal, a microprocessor (microprocessor), a graphics processing unit (GPU), an artificial intelligence (AI) processor, a neural processing unit (NPU), time controller (TCON), but is not limited thereto, and may include one or more among central processing unit (CPU), micro controller unit (MCU), micro processing unit (MPU), controller, application processor (AP), communication processor (CP), an ARM processor, or may be defined by the term. In addition, the processor 130 may be implemented as a system on chip (SoC), large scale integration (LSI), or an application specific integrated circuit (ASIC) or field programmable gate array (FPGA) with a built-in processing algorithm.

In addition, the processor 130 for executing the artificial intelligence model according to an embodiment may be implemented through a combination of a general-purpose processor such as a CPU, an AP, a digital signal processor (DSP), etc., a graphics-only processor such as a GPU, a vision processing unit (VPU), or artificial intelligence dedicated processor and software such as an NPU. The processor 130 may control to process input data according to a predefined operation rule or an artificial intelligence model stored in the memory 120. Alternatively, when the processor 130 is a dedicated processor (or artificial intelligence-only processor), it may be designed with a hardware structure specialized for processing a specific artificial intelligence model. For example, hardware specialized for processing a specific artificial intelligence model may be designed as a hardware chip such as an ASIC, FPGA, or the like. When the processor 130 is implemented as a dedicated processor, it may be implemented to implement a memory for implementing an embodiment of the disclosure, or may be implemented to include a memory processing function for using an external memory.

The processor 130 obtains an output image by image processing an input image. Here, the input image or the output image may include a still image, a plurality of continuous still images (or frames), or a video. Image processing may be a digital image processing including at least one of image enhancement, image restoration, image transformation, image analysis, image understanding or image compression, and scaling. According to an example, when the electronic apparatus 100 is implemented to include a video wall display including a plurality of display modules, the operation according to various embodiments of the disclosure may be performed by a main processor (or an image processing apparatus including the main processor) included in a master display module that processes the input image. In this case, the processor 130 may divide the acquired output image into areas to be displayed in each of the plurality of display modules, and transmit an image corresponding to each area to the corresponding display module. For example, when a plurality of display modules are connected by a daisy chain communication method, an image corresponding to each area may be transmitted through the corresponding communication method.

For example, when a high-resolution image such as 4K or 8K is input, the processor 130 may obtain an output image by downscaling the input image as necessary. For example, the processor 130 may downscale the input image when a resolution of the input image is higher than a resolution of the display 110. According to an example, various pre-processing may be performed on the input image before downscaling. However, hereinafter, for convenience of description, the input image and the pre-processed image are not distinguished and are called the input image. According to an example, the processor performing image processing and the processor controlling the display of the output image may be implemented as separate processors. However, even if it is implemented as a separate processor, it is not necessarily implemented as a separate chip and may be implemented as a single chip.

Hereinafter, for convenience of description, and without limitation, a description will be given of downscaling the input image by identifying a plurality of areas in the input image and applying different low-frequency filters to the plurality of areas. However, area identification and downscaling may be performed in parallel or one of them may be performed first on the other according to an embodiment. Here, the area is a term that may refer, for example, to a part of an image and may refer to at least one pixel block or a set of pixel blocks. A pixel block may refer, for example, to a set of adjacent pixels including at least one pixel.

According to an embodiment of the disclosure, the processor 130 may identify the input image as a plurality of areas by applying a filter (hereinafter referred to as a pattern filter) for pattern detection to the input image. Here, the identified plurality of areas may be divided into a area including a pattern (or a area having a high probability of including the pattern) and a area not including the pattern (or a area having a low probability of including the pattern). Here, the pattern may refer to a regularity or pattern of a repeating shape, and for example, a stripe pattern, a check pattern, a dot pattern, or the like may correspond thereto.

The processor 130 may obtain a downscaled image by applying a first low-frequency filter to a first area among the identified plurality of areas and a second low-frequency filter to a second area. Here, a cut-off frequency of a second low-frequency filter may be higher than a cut-off frequency of a first low-frequency filter. At least one of the cut-off frequency of the first low-frequency filter and the cut-off frequency of the second low-frequency filter may be determined based on a downscaling ratio of the input image. For example, when downscaling the input image by a ratio of 1/n, the cut-off frequency of the first low-frequency filter or the cut-off frequency of the second low-frequency filter may be determined as a frequency corresponding to 1/n of the entire frequency band. Here, the cut-off frequency may refer, for example, to a frequency that serves as a boundary standard between a frequency band of a part to be passed in a signal processing filter and a frequency band that needs to be cut off or attenuated. The low-frequency filter may pass frequencies below (or less than or equal to) the cut-off frequency and remove frequencies greater than or equal to (or exceeding) the cut-off frequency.

Applying the low-frequency filter to the input image may refer, for example, to performing convolution the low-frequency filter to the input image. Convolution may refer, for example, to an image processing technique using a weighted filter, and may refer to a technique of obtaining a sum after multiplying a pixel value of an input image by a corresponding weight (or coefficient) included in the filter. Here, the filter may also be referred to as a mask, window, or kernel. In other words, numerical values included in the Laplacian filter may be a weight (a numerical value indicating how many corresponding pixels will be used). As the downscaling method, various conventional methods including subsampling, bilateral interpolation, and bicubic interpolation may be used.

According to an example, the processor 130 may apply a pattern filter to the input image to identify the input image as a plurality of areas including a area having a pattern inclusion probability greater than or equal to a threshold value and a area having a pattern inclusion probability less than the threshold value.

According to an example, the pattern filter may include a plurality of pattern filters for detecting each of a plurality of type patterns. For example, the pattern filter may include a first pattern filter for detecting a first type pattern and a second pattern filter for detecting a second type pattern. Here, the pattern type may be classified based on a pattern period. Here, the pattern period may refer to how many pixel intervals the pattern is repeated. For example, a pattern period corresponding to the second type pattern may be greater than the pattern period corresponding to the first type pattern. For example, a stripe pattern may be classified based on a thickness (or width) of a pattern line included in the pattern. For example, a thickness (or width) of the pattern line included in the second type pattern may be greater than a thickness of the pattern line included in the first type pattern. However, the disclosure is not limited thereto, and the pattern type may be classified based on a pattern direction, a pattern size, a pattern shape, or the like.

For example, the processor 130 may identify the input image into a plurality of areas based on a first output value acquired by applying a first pattern filter to the input image and a second output value acquired by applying a second pattern filter to the input image.

According to an embodiment, the processor 130 may identify the input image as a first area having a pattern inclusion probability greater than or equal to a threshold value and a second area having a pattern inclusion probability less than a threshold value based on a sum of the first output value and the second output value. In this case, the sum of the first output value and the second output value may have a high value when at least one of the first pattern and the second pattern is included in the input image. For example, when the summed value is expressed as a value between 0 and 1 through normalization, it may have a value close to 1 when at least one of the first pattern or the second pattern is included in the input image.

In this case, the processor 130 may downscale the image by applying the first low-frequency filter to the first area and the second low-frequency filter to the second area. In other words, a first frequency filter having a low cut-off frequency may be applied to a first area having a high pattern inclusion probability, and a second frequency filter having a high cut-off frequency may be applied to a second area having a low pattern inclusion probability. Accordingly, it may be possible to prevent and/or reduce the remaining area from being blurred while preventing and/or reducing aliasing of the pattern area.

According to another example, the processor 130 may identify, based on the first output value and the second output value, the input image as a third area in which the inclusion probability of the first type pattern is equal to or greater than a threshold value, and a fourth area in which the inclusion probability of the second type pattern is equal to or greater than the threshold value, and a fifth area in which a probability of including the pattern is less than a threshold value.

In this case, the processor 130 may downscale the image by applying the first low-frequency filter to the third area, the second low-frequency filter to the fifth area, and the third low-frequency filter to the fourth area. Here, a cut-off frequency of the third low-frequency filter may be higher than a cut-off frequency of the first low-frequency filter and lower than a cut-off frequency of the second low-frequency filter. In other words, a first frequency filter having a low cut-off frequency may be applied to a third area having a high probability of including the first type pattern, and a third frequency filter having a higher frequency than the first frequency filter but lower than the second frequency filter to the fourth area, and a second frequency filter having a high cut-off frequency may be applied to the fifth area having a low pattern inclusion probability. Accordingly, as a low-frequency filter suitable for characteristics of each pattern area is applied, it may prevent and/or reduce aliasing of the pattern area while preventing and/or reducing the remaining areas from being blurred.

In the example described above, for convenience of description, it has been described that the input image is downscaled by dividing areas and applying a low-frequency filter corresponding to each divided area. However, according to an embodiment, after filtering the input image based on each of a plurality of low-frequency filters, a weight value corresponding to the plurality of filtered images is applied, and a downscaled image may be acquired by adding corresponding pixel values included in the plurality of images to which the weight value is applied. In this case, the same effect as that of image processing by applying a low-frequency filter corresponding to each divided area by dividing the area may occur.

For example, the processor 130 may obtain a downscaled first image by applying the first low-frequency filter to the input image, and may obtain a downscaled second image by applying the second low-frequency filter to the input image. In addition, the processor 130 may obtain a first weight value for identifying a plurality of areas by applying a filter for pattern detection to the input image, and obtain a downscaled image by applying the acquired first weight value to the downscaled first image and applying the acquired second weight value based on the first weight value to the downscaled second image. For example, the processor 130 may acquire a downscaled image by summing corresponding pixel values of the first image to which the first weight value is applied and the second image to which the second weight value is applied. Here, the second weight value may be acquired as "1−weight" when the first weight value has a value between 0 and 1.

In this case, the processor 130 may obtain a plurality of output values by applying a plurality of filters for detecting a plurality of type patterns to the input image, and obtain a first weigh value by normalizing after summing the plurality of output values. Accordingly, it may be possible to identify whether a pattern is included regardless of the type of pattern included in the input image.

Figure 7A:
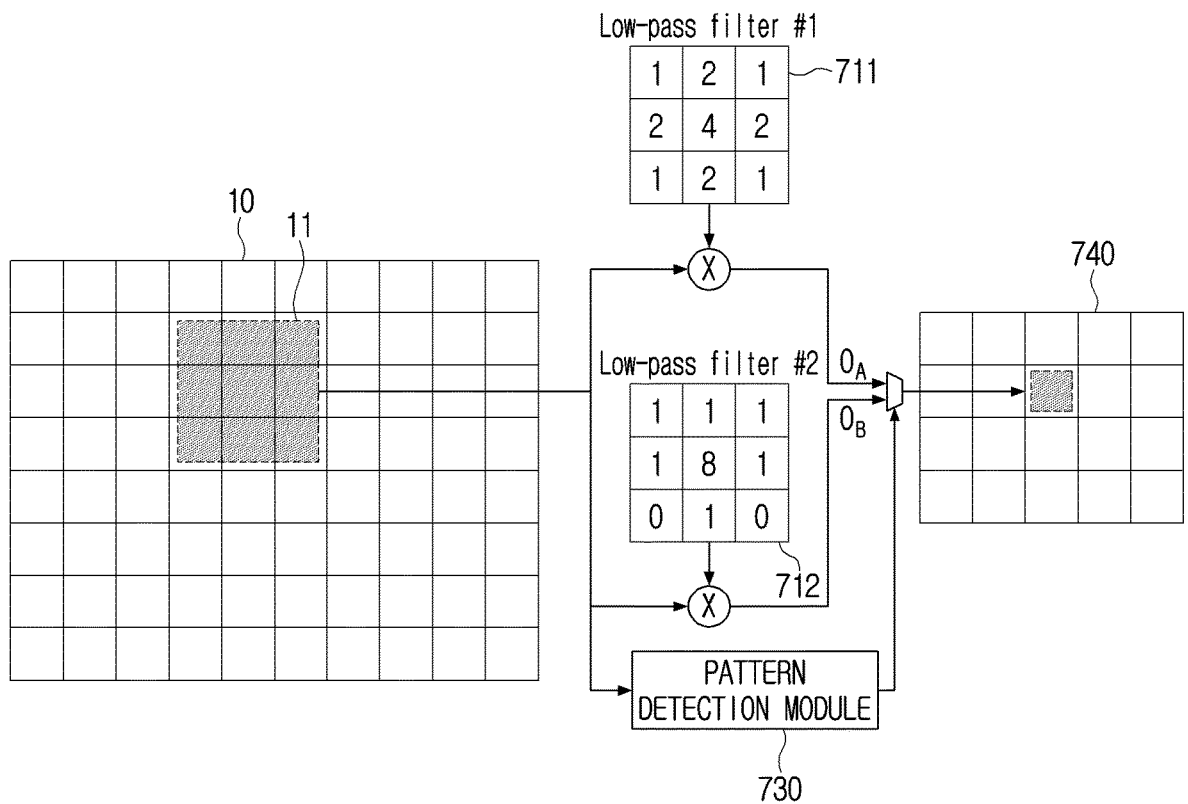
FIGS. 7A and 7B are diagrams illustrating an example method of downscaling an image by applying a low-frequency filter according to various embodiments.
Figure 7B:
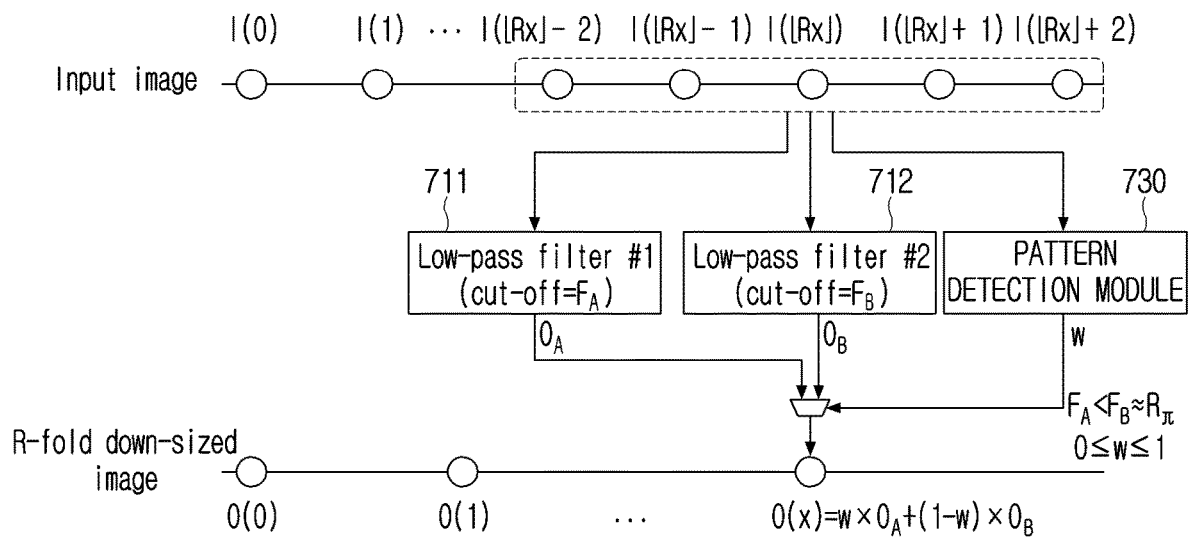

FIGS. 7A and 7B are diagrams illustrating an example method of downscaling an image by applying a low-frequency filter according to various embodiments.

FIG. 7A is a two-dimensional view illustrating a method of applying a low-frequency filter, and FIG. 7B is a diagram illustrating a one-dimensional signal and equation.

As illustrated in FIGS. 7A and 7B, the processor 130 may respectively apply different low-frequency filters, for example, a first low-frequency (e.g., low-pass) filter 711 and a second low-frequency (e.g., low-pass) filter 712 to a pixel area 11 of an input image 10 to acquire a first output value and a second output value. Here, the first low-frequency filter 711 and the second low-frequency filter 712 may have different filter coefficients and, in particular, may be filters having different cut-off frequencies.

The processor 130 may obtain a third output value by applying a pattern filter to a corresponding pixel area 11 through a pattern detection module 730. Here, the third output value may be a weight value w indicating a probability that the pixel area 11 includes the pattern, and the weight value may have a value of 0≤w<1 through normalization.

The electronic apparatus 100 may multiply an output pixel value $O_A$ acquired by applying the first low-frequency filter 711 by the weight value w, and an output pixel value $O_B$ acquired by applying the second low-frequency filter 711 by 1−w to obtain an output pixel value 740. In other words, as for the output pixel values $O_A$ and $O_B$ of the two low-frequency filters 711 and 712, the processor 130 may obtain a pixel value of the output image by a weighted sum using a pattern intensity acquired through the pattern detection module 730 as a weight. If this is expressed as an equation, it may be expressed as Equation 3 below.

$$O = wO_A + (1-w)O_B \quad \text{[Equation 3]}$$

Here, $O_A$ and $O_B$ are pixel values acquired by applying the first low-frequency filter 711 and the second low-frequency filter 712, respectively. A cut-off frequency of the first low-frequency filter 711 is $F_A$ and a cut-off frequency of the second low-frequency filter 712 is $F_B$. $F_A$ and $F_B$ may have values close to the cut-off frequency Ra described above, but $F_A$ is smaller than $F_B$ ($F_A < F_B$). Accordingly, the $O_A$ may be a blurry image than the $O_B$.

According to an embodiment, as shown in Equation 3, an output image may be generated as a weighted sum of $O_A$ and $O_B$. Here, the weight w may be a value between 0 and 1 calculated by the pattern detection module 730 and may have a different value for each pixel of the image.

Figure 8:
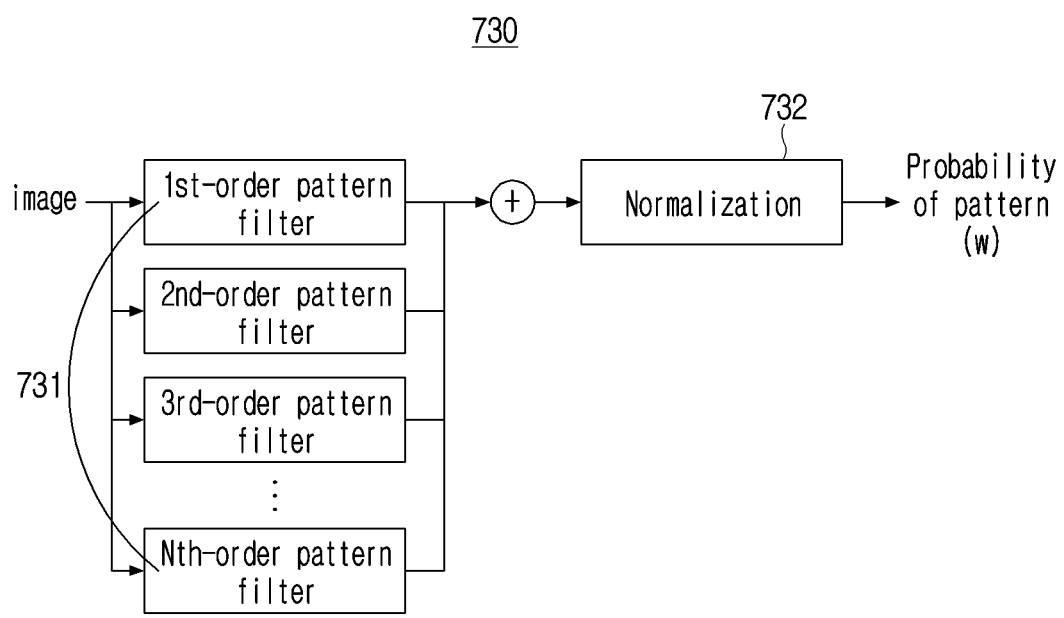
FIG. 8 is a diagram illustrating an example operation of a pattern detection module according to various embodiments.

FIG. 8 is a diagram illustrating an example operation of a pattern detection module according to various embodiments.

The pattern detection module (e.g., including various processing circuitry and/or executable program instructions) 730 according to an embodiment may be implemented with at least one of software or hardware, or a combination thereof. The pattern detection module 730 may include a plurality of pattern filters 731 and a normalization module 732. Here, the plurality of pattern filters may include filters for detecting different types of patterns. Different types of patterns may refer to different pattern periods. However, the present disclosure is not limited thereto, and it may include a case that a direction, a length, or the like of the pattern is different.

The normalization module 732 may include various processing circuitry and/or executable program instructions and normalize and output a sum of the output values of the plurality of pattern filters 731. According to an example, when it is identified that an output pixel is a pattern area, w is output to be close to 1, otherwise, it may be output to be close to 0.

The processor 130 may apply the w value output from the pattern detection module 730 to a first image acquired by applying the first low-frequency filter 711, that is, the first pixel value $O_A$, and apply the 1−w value to a second image acquired by applying the second low-frequency filter 712, that is, the second pixel value $O_B$, and obtain a downscaled output image based on the weighted image, that is, the pixel value. Here, the first low-frequency filter 711 may have a relatively low cut-off frequency, and the second low-frequency filter 712 may have a relatively high cut-off frequency. As a result, the first low-frequency filter 711 having a low cut-off frequency may be applied to the area identified to be the pattern area for each pixel, and in other cases, the second low-frequency filter 712 having a high cut-off frequency may be applied.

Figure 9A:
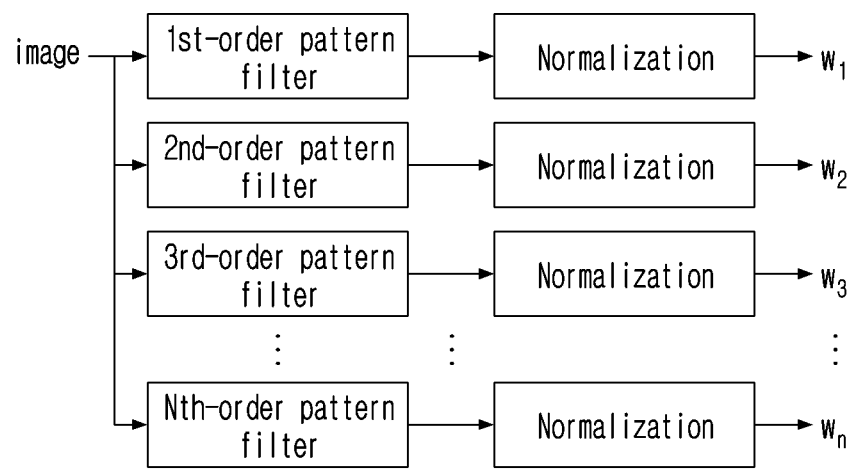
FIGS. 9A and 9B are diagrams illustrating an example method of downscaling an image by applying a low-frequency filter according to various embodiments.
Figure 9B:
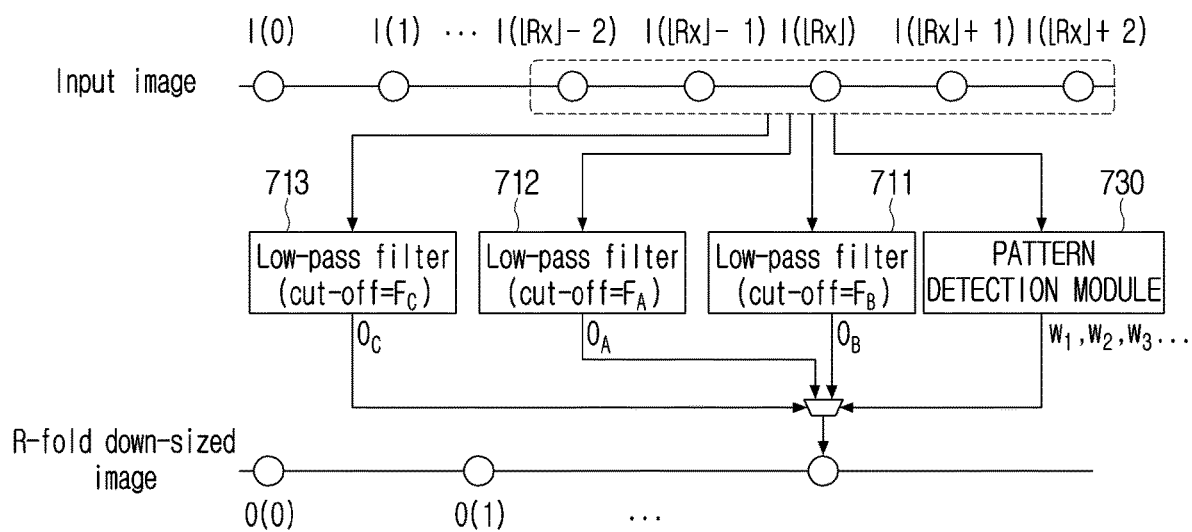

FIGS. 9A and 9B are diagrams illustrating an example method of downscaling an image by applying a low-frequency filter according to various embodiments.

In FIGS. 7A, 7B, and 8, it has been described that the pattern detection module 730 detects the presence or absence of a pattern by summing the output values of each pattern filter. However, according to another example, it is also possible to detect the pattern type as well as the presence or absence of the pattern and apply a different low-frequency filter to each pattern type.

For example, as shown in FIG. 9A, the pattern detection module may identify the type of pattern included in the pixel area by applying a plurality of pattern type filters for detecting different types of patterns to the pixel area of the input image. In other words, weights w1, w2, w3, . . . , wn corresponding to each pattern type may be acquired by normalizing the output value of each pattern type filter.

In this case, as shown in FIG. 7B, not only two low-frequency filters 711 and 712 are applied, but three or more low-frequency filters 711, 712, 713, . . . may be applied as shown in FIG. 9B to downscale the image. For example, when three low-frequency filters are applied, the processor 130 may weight sum pixel values by applying the w1 value output from the pattern detection module 730 to the first pixel value $O_A$ acquired by applying the first low-frequency filter 711, and applying the w2 value to a third pixel value $O_C$ acquired by applying the third low-frequency filter 713, and applying a w0 value to the second pixel value $O_B$ acquired by applying the second low-frequency filter 712. Here, the sum of w1, w2, and w0 may be 1, and it may be calculated as w0=max(0, 1−w1−w2). Accordingly, a low-frequency filter corresponding to each pattern type may be applied to obtain a downscaled output image.

FIGS. 10A, 10B, 10C, 11A, 11B and 11C are diagrams illustrating an example configuration of a pattern filter according to various embodiments.

Figure 10A:
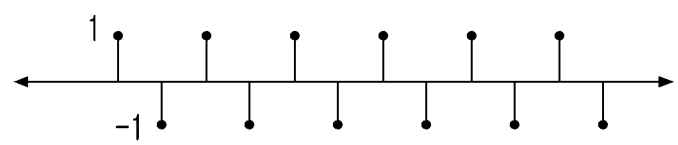
FIGS. 10A, 10B, 10C, 11A, 11B and 11C are diagrams illustrating example configurations of a pattern filter according to various embodiments.
Figure 10B:
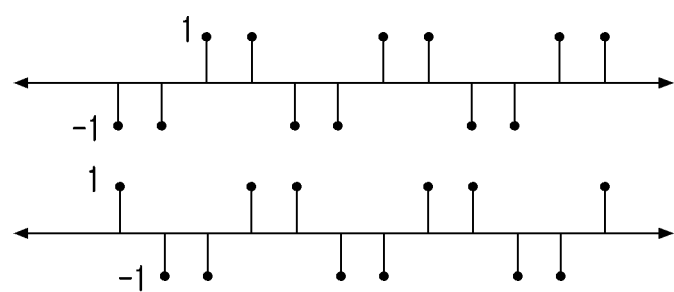
Figure 10C:
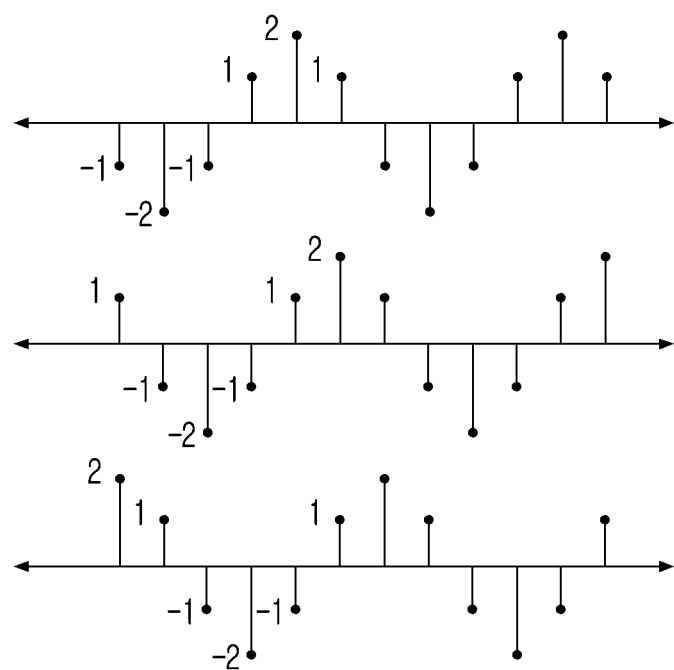
Figure 11A:
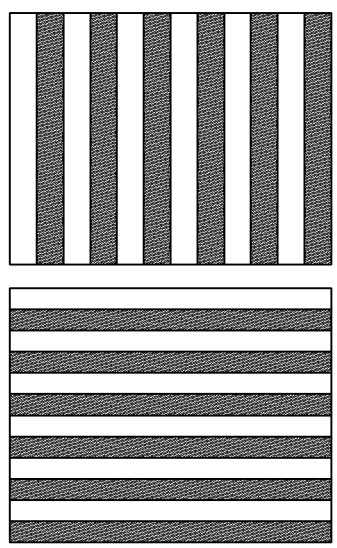
Figure 11B:
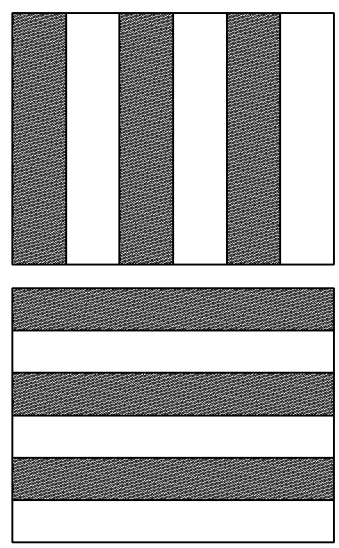
Figure 11C:
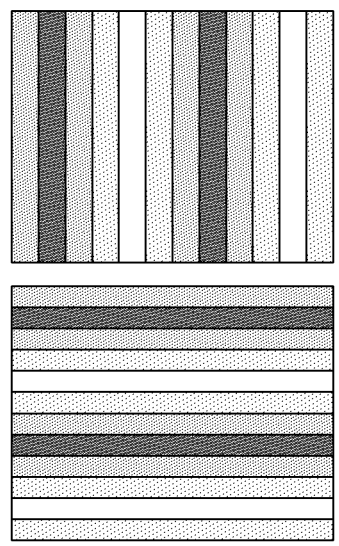

FIGS. 10A, 10B and 10C show a one-dimensional pattern filter, and FIGS. 11A, 11B and 11C show a two-dimensional pattern filter. An operation of the pattern filter shown in FIGS. 10A, 10B and 10C and FIGS. 11A, 11B and 11C is the same as or similar to that of the low-frequency filter, but unlike the low-frequency filter, the filter coefficients may be repeated.

Figure 12:
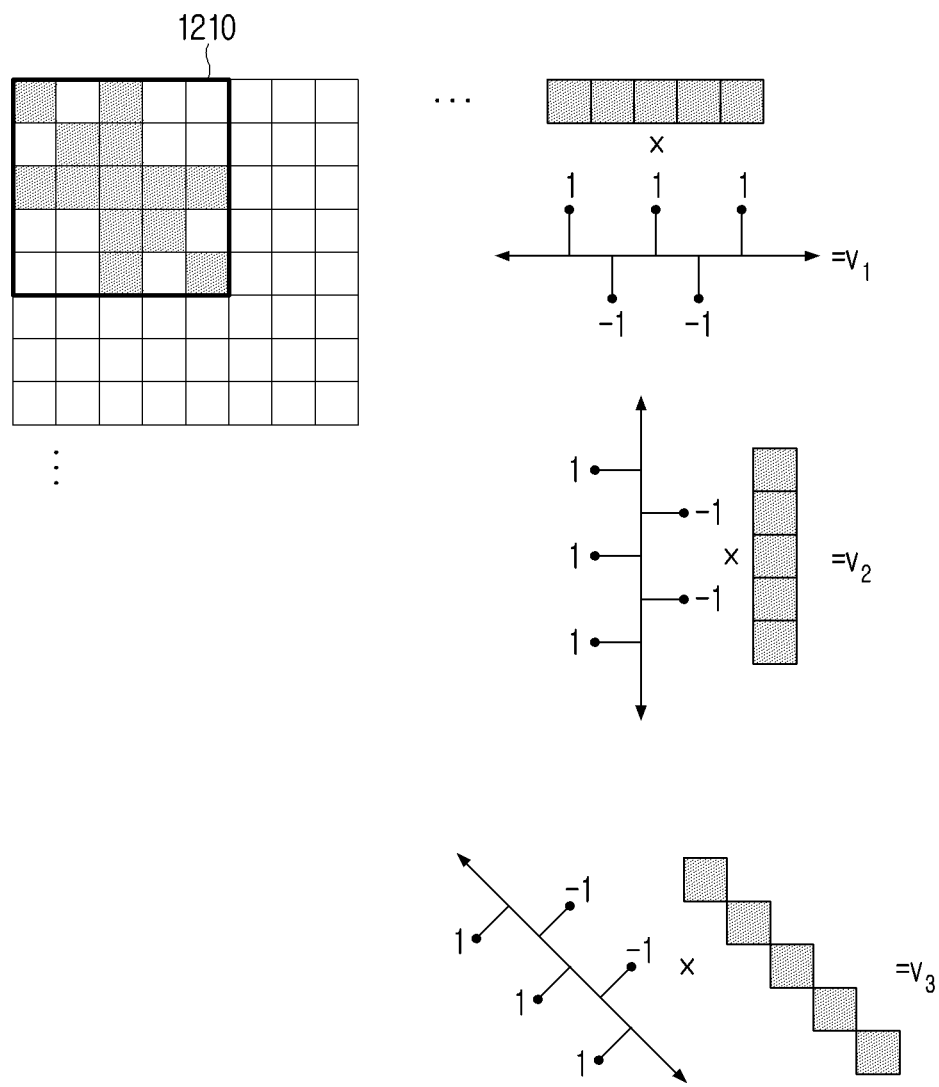
FIG. 12 is a diagram illustrating an example method of applying a pattern filter according to various embodiments.

According to various embodiments, a pattern may be detected by applying the one-dimensional pattern filter shown in FIGS. 10A, 10B and 10C in several directions, or a pattern in two directions (e.g., a horizontal direction and a vertical direction) may be detected by applying a n*n type 2D pattern filter shown in FIGS. 11A, 11B and 11C. For example, as shown in FIG. 12, output values v1, v2, and v3 are acquired by applying the one-dimensional filter in the horizontal, vertical, and diagonal directions, and the acquired output values are added to obtain a final probability value v.

As shown in FIG. 10A, $1^{st}$-order pattern filter is a filter for detecting a pattern area in which 1 and −1 are periodically repeated, and a pattern period is 1 pixel. As shown in FIG. 10B, $2^{nd}$-order pattern filter is a filter for detecting a pattern area having a pattern period of 2 pixels. In the same principle, as shown in FIG. 10C, a plurality of pattern filters may be defined up to a $3^{rd}$-order filter or a higher Nth-order filter.

An output of the pattern filter may have a high value when a pixel configuration of the input image has a shape similar to that of the pattern filter, and a low value otherwise. Accordingly, various types of pattern areas may be simultaneously detected using a plurality of pattern filters for detecting different types of patterns.

Figure 13:
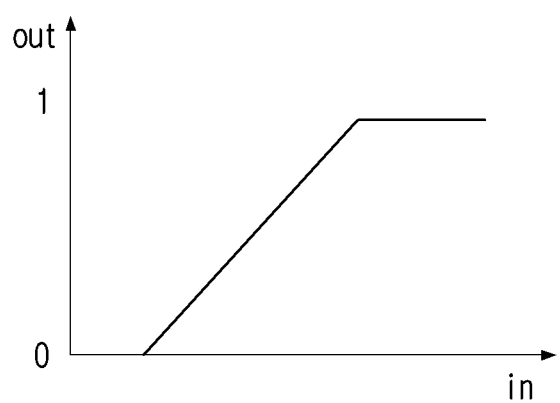
FIG. 13 is a graph illustrating an example method of normalizing an output of a pattern filter according to various embodiments.

A normalization module 732 is configured to sum output values of the plurality of pattern filters and change them to a value between 0 and 1 using variance of input pixels. In the process, a linear function as shown, for example, in the graph of FIG. 13 may be used.

FIGS. 14A, 14B, 14C and 14D are diagrams illustrating example pattern detection results according to various embodiments.

Figure 14A:
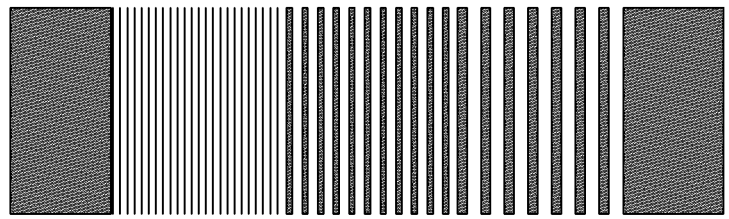
FIGS. 14A, 14B, 14C and 14D are diagrams illustrating an example pattern detection result according to various embodiments.

FIG. 14A illustrates an example of an input image, and the input image may be an image having a pattern of pixel 1, pixel 2, and pixel 3 periods on a black background as shown.

Figure 14B:
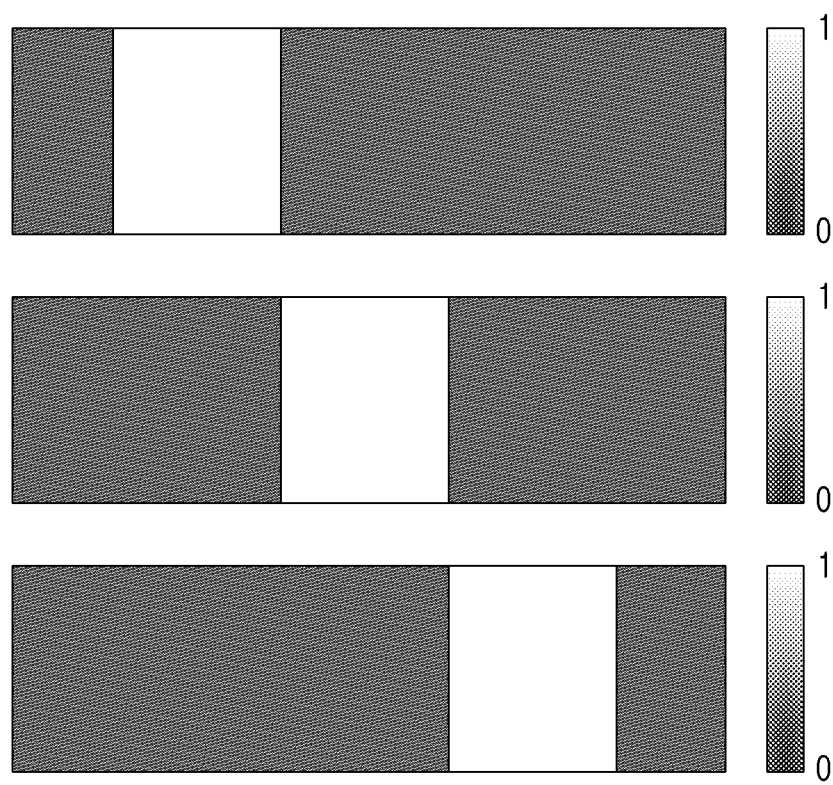

FIG. 14B shows a pattern detection result acquired by applying the $1^{st}$-order pattern filter, the $2^{nd}$-order pattern filter, and the 3rd-order pattern filter, respectively, to the input image shown in FIG. 14A sequentially from the top.

As shown in FIG. 14B, a result of applying the $1^{st}$-order pattern filter has a high value in a area having a pattern of pixel period 1. Similarly, results of applying the $2^{nd}$-order pattern filter and the $3^{rd}$-order pattern filter have high values in the area where a pattern of pixel period 2 and a pattern of pixel period 3 are, respectively.

Figure 14C:
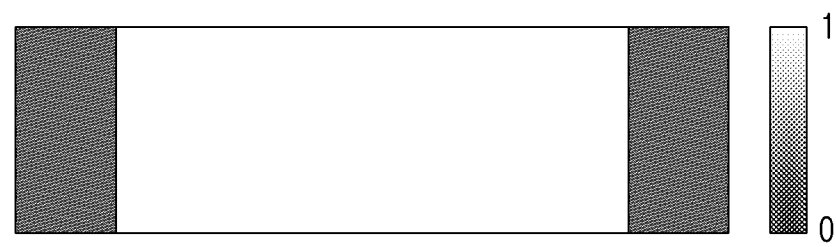

FIG. 14C shows a final pattern detection result, all pattern areas in the input image have high values.

Figure 14D:
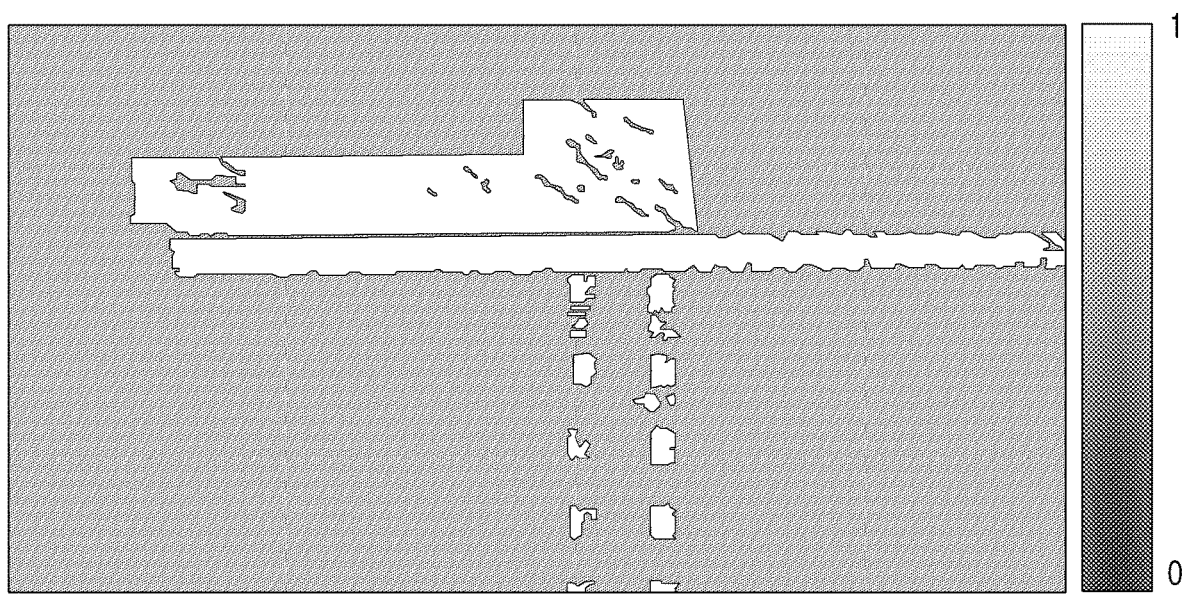

FIG. 14D shows a pattern detection result for the input image shown in FIG. 5A. As shown in FIG. 14D, the pattern detection result mainly has a high value in the roof area having the pattern in the input image and has a small value in the other areas.

The processor 130 may control the display 110 to display the downscaled image acquired according to the embodiment described above.

According to an embodiment of the disclosure, the electronic apparatus 100 may obtain a weight corresponding to the pattern area using a deep learning-based artificial neural network (or deep artificial neural network), that is, a learning network model. The learning network model may be designed to obtain output data desired by a user through continuous convolutional multiple operation on input images, and may be implemented in the form of a system that learns many images. For example, the learning network model may be learned to output a weight related to whether or not a pattern is included when an image is input. As another example, when an image is input, the learning network model may be learned to output a weight related to whether or not each pattern type is included. For example, the learning network model may be implemented, for example, and without limitation, as at least one deep neural network (DNN) model of convolutional neural network (CNN), recurrent neural network (RNN), long short term memory network (LSTM), gated recurrent units (GRU), generative adversarial networks (GAN), or the like.

In the embodiment described above, the scaling processing according to an embodiment of the disclosure has been described, but other image processing such as, for example, and without limitation, decoding and enhancement processing (e.g., noise removal processing, sharpening, and texture processing), or the like, may be additionally performed. In addition, additional scaling processing may be performed in addition to the scaling processing according to an embodiment of the disclosure according to an embodiment.

Figure 15A:
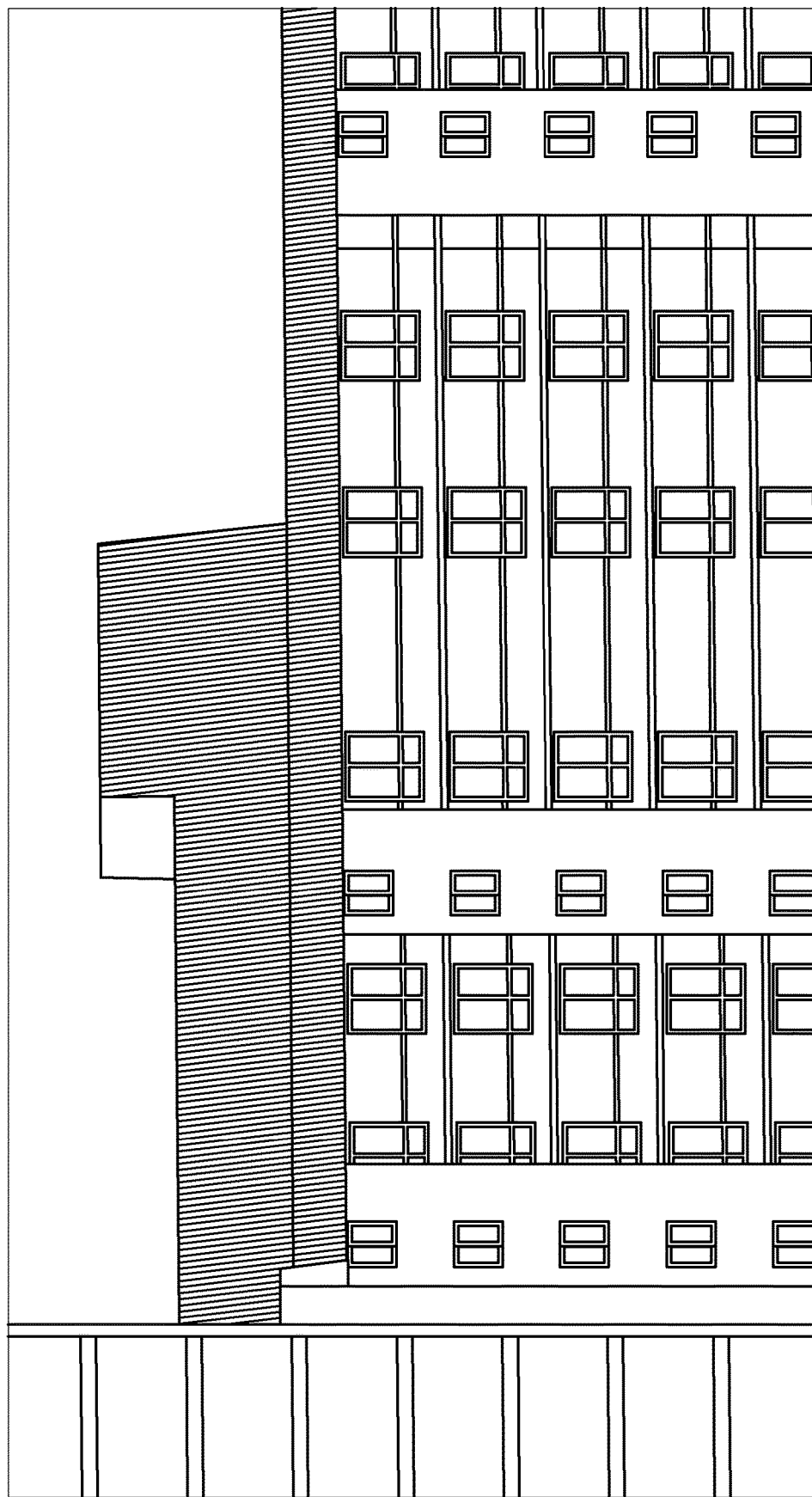
FIGS. 15A, 15B and 15C are diagrams illustrating an example effect according to various embodiments.
Figure 15B:
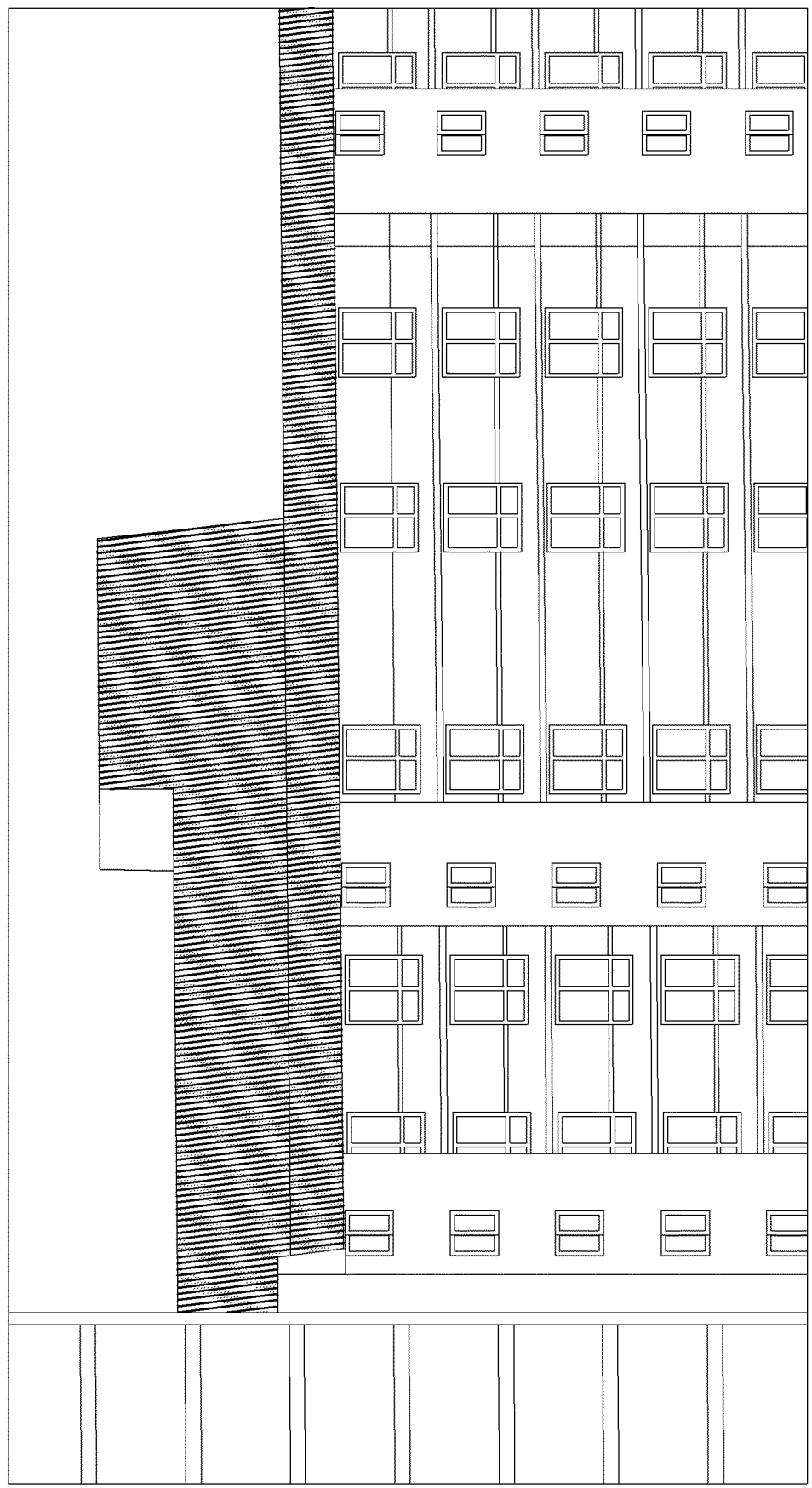
Figure 15C:
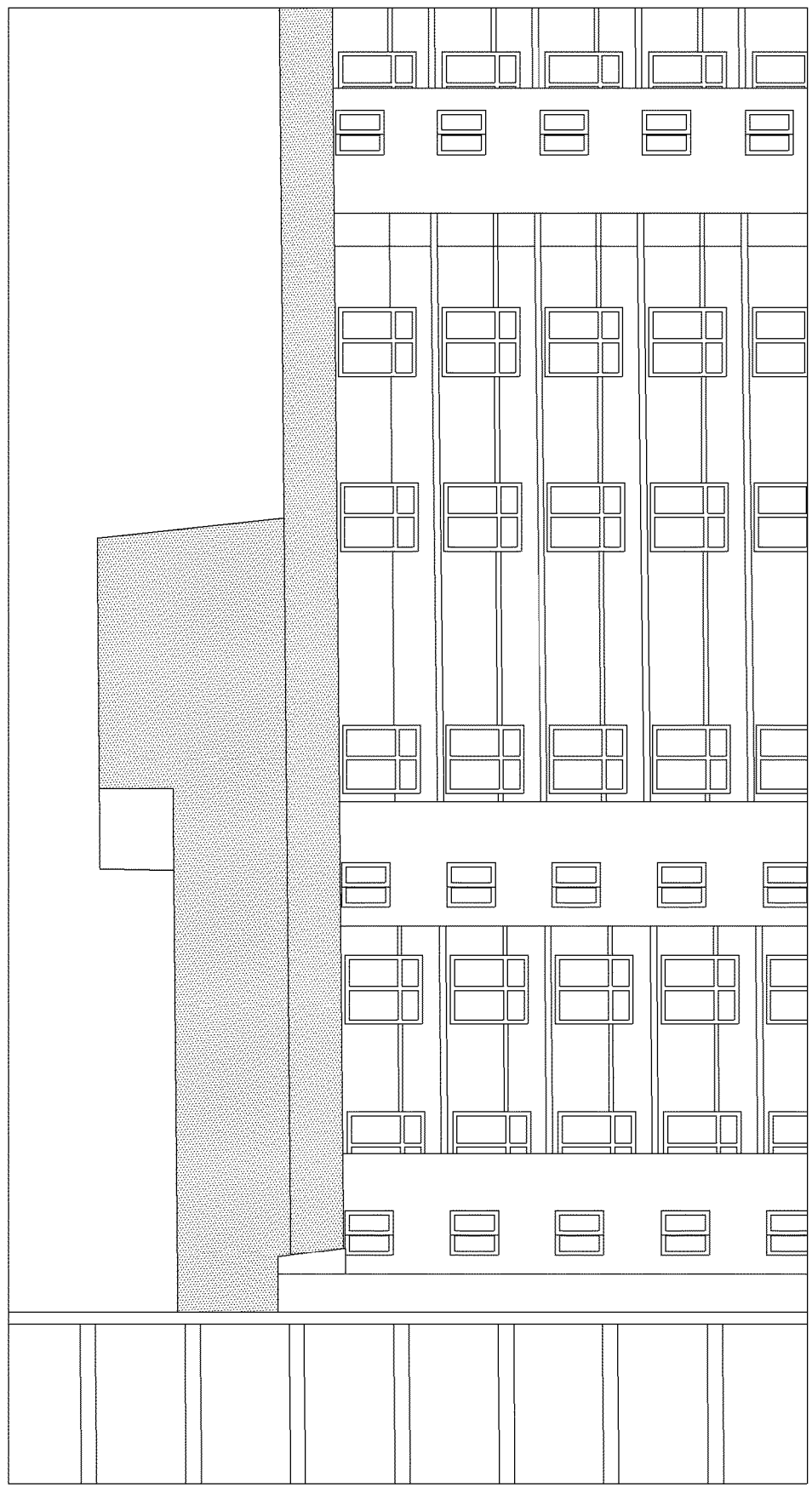

FIGS. 15A, 15B and 15C are diagrams illustrating an example effect according to various embodiments.

FIG. 15A is an image acquired by downscaling an input image as shown in FIG. 5A by 1/3 in a 'Ground truth' method. Here, the 'Ground truth' method may refer, for example, to a method in which a low-frequency filter is used but a size of the filter is sufficiently large. If you look at the 'Ground truth' result, aliasing is not generated in the roof area and details in other areas are not lost.

FIG. 15B is an image in which the input image as shown in FIG. 5A is downscaled by 1/3 using a low-frequency filter having a small size without detecting a pattern area.

FIG. 15C is an image in which the input image as shown in FIG. 5A is downscaled by 1/3 using a small low-frequency filter according to a result of detecting a pattern area according to the disclosure. In FIG. 15B, aliasing is generated on the roof part as a small low-frequency filter is used, but when the disclosure is applied as shown in FIG. 15C, even if a small low-frequency filter is used, the aliasing of the roof part does not appear and details about other parts are not damaged.

In other words, according to the disclosure, even if a small low-frequency filter is used, an image may be downscaled without aliasing the pattern area. For example, aliasing of the pattern area may be prevented and/or reduced and a sharpness of the general area may be maintained high by detecting a pattern area and passing a low-frequency band for the pattern area and a high frequency band for a normal area.

Figure 16:
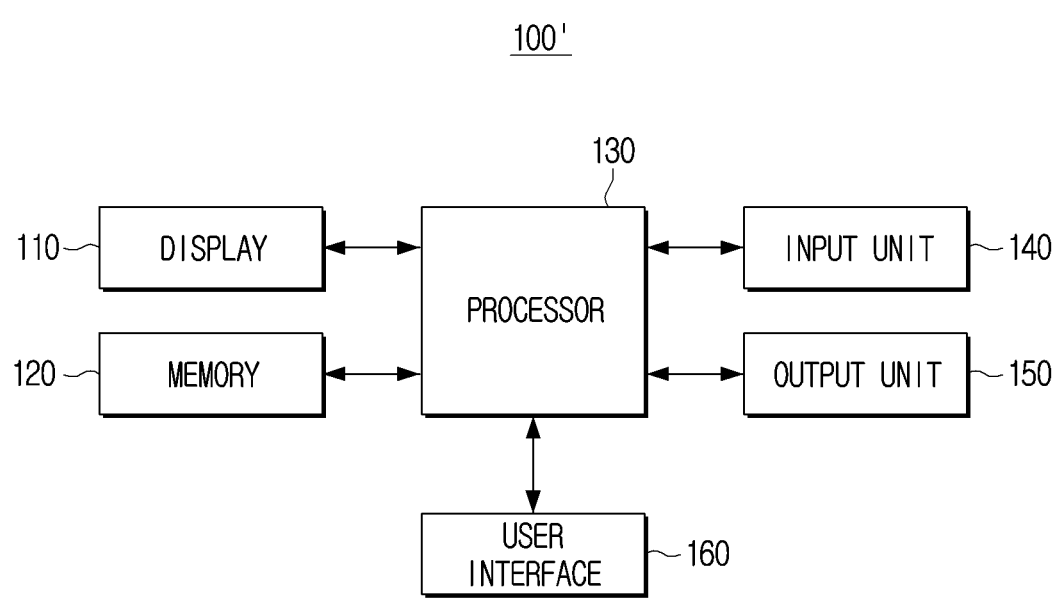
FIG. 16 is a block diagram illustrating an example configuration of an electronic apparatus according to various embodiments.

FIG. 16 is a block diagram illustrating an example configuration of an electronic apparatus according to various embodiments.

Referring to FIG. 16, a display apparatus 100' includes a display 110, a memory 120, a processor (e.g., including processing circuitry) 130, an input unit (e.g., including input circuitry) 140, an output unit (e.g., including output circuitry) 150, and a user interface (e.g., including user interface circuitry) 160. In FIG. 10, a description of the elements shown in FIG. 6 may not be repeated.

According to an embodiment, the memory 120 may be implemented as a single memory that stores data generated in various operations according to the disclosure. However, according to an embodiment, the memory 120 may be implemented to include first to third memories.

The first memory may store at least a part of an image input through the inputter 110. For example, the first memory may store at least a part of an input image frame. In this case, at least a partial area may be a area necessary to perform image processing according to an embodiment. According to an embodiment, the first memory may be implemented as an N-line memory. For example, the N-line memory may be a memory having a capacity corresponding to 17 lines in a vertical direction, but is not limited thereto. For example, when a full HD image of 1080p (resolution of 1,920×1,080) is input, only an area of 17 lines in the full HD image is stored in the first memory. As such, the first memory is implemented as an N-line memory, and the reason that only a part of the input image frame is stored for image processing is because the memory capacity of the first memory is limited due to hardware limitations.

The second memory may be a memory for storing at least one of low-frequency filter information and pattern filter information, and may be implemented as a memory of various sizes according to various embodiments.

The third memory may be a memory in which an output image downscaled by applying a low-frequency filter is stored, and may be implemented as a memory of various sizes according to various embodiments. The third memory may be implemented with a size equal to or larger than a size of an input image. According to an embodiment, in the case of outputting an image in units of images corresponding to a size of the first memory or in units of pixel lines, the image may be implemented with an appropriate size for storing the corresponding image. However, when the output image is overwritten in the first memory or the second memory, or the output image is displayed without being stored, the third memory may not be required.

The input unit 140 may include various input circuitry and receives various types of content. For example, the input unit 140 may receive an image signal in a streaming or download manner from an external device (e.g., a source device), an external storage medium (e.g., a USB memory), an external server (e.g., a web hard drive), or the like through a communication method such as an AP-based Wi-Fi (Wireless LAN network), Bluetooth, Zigbee, wired/wireless local area network (LAN), wide area network (WAN), Ethernet, IEEE 1394, high-definition multimedia Interface (HDMI), universal serial bus (USB), mobile high-definition link (MHL), audio engineering society/European broadcasting union (AES/EBU), Optical, Coaxial, or the like. Here, the image signal may be any one of a standard definition (SD), high definition (HD), full HD, or ultra-HD image, but is not limited thereto.

The output unit 150 may include various output circuitry and outputs a sound signal. For example, the output unit 150 may convert a digital sound signal processed by the processor 130 into an analog sound signal, amplify the signal to output it. For example, the output unit 150 may include at least one speaker unit, a D/A converter, an audio amplifier, or the like, capable of outputting at least one channel. According to an embodiment, the output unit 150 may be implemented to output various multi-channel sound signals. In this case, the processor 130 may control the output unit 150 to enhance and output the input sound signal to correspond to the enhancement processing of the input image. For example, the processor 130 may convert an input two-channel sound signal into a virtual multi-channel (e.g., 5.1-channel) sound signal, recognize a location where the electronic apparatus 100' is placed to process it as a stereoscopic sound signal optimized for the space, or provide an optimized sound signal according to a type of the input image (e.g., content genre).

The user interface 160 may include various user interface circuitry and may be implemented to be device such as button, touch pad, mouse and keyboard, or may be implemented to be touch screen, remote control transceiver, etc. that can perform the above-described display function and manipulation input function together. The remote control transceiver may receive a remote control signal from an external remote control device or transmit a remote control signal through at least one of infrared communication, Bluetooth communication, and Wi-Fi communication.

The electronic apparatus 100' may additionally include a tuner and a demodulator according to an embodiment. A tuner (not shown) may receive a radio frequency (RF) broadcast signal by tuning a channel selected by the user or all channels previously stored among RF broadcast signals received through an antenna. A demodulator (not shown) may receive and demodulate a digital IF signal (DIF) converted by the tuner, and may perform channel decoding or the like. According to an embodiment, the input image received through the tuner may be processed through a demodulator (not shown) and then provided to the processor 130 for shadow processing according to an embodiment of the disclosure.

Figure 17:
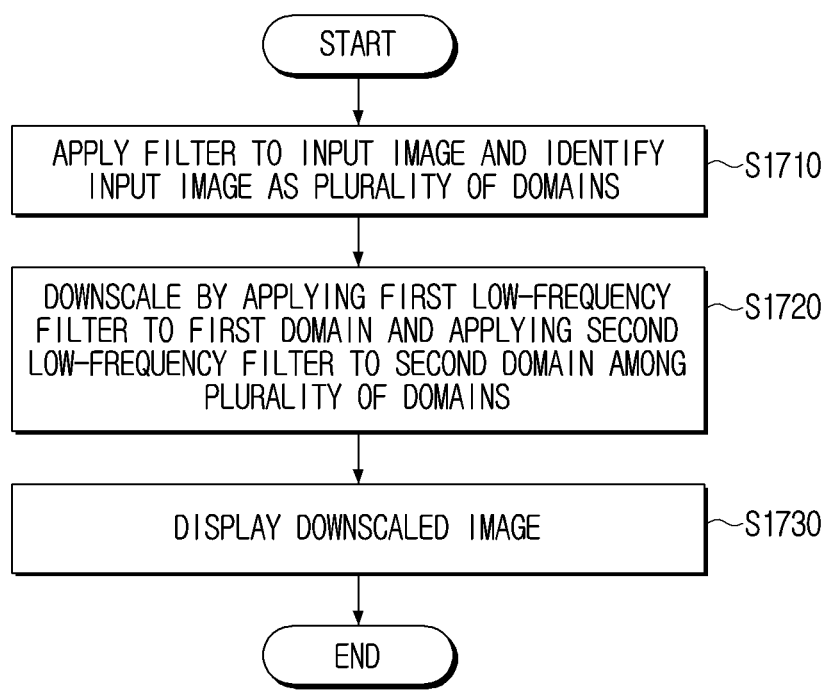
FIG. 17 is a flowchart illustrating an example image processing method according to various embodiments.

FIG. 17 is a flowchart illustrating an example image processing method according to various embodiments.

According to an image processing method shown in FIG. 17, the input image may be identified as a plurality of areas by applying a filter for pattern detection to the input image (S1710).

A downscaling may be performed by applying the first low-frequency filter to the first area and the second low-frequency filter to the second area among the plurality of areas (S1720). Here, a cut-off frequency of the second low-frequency filter may be higher than a cut-off frequency of the first low-frequency filter. At least one of the cut-off frequency of the first low-frequency filter and the cut-off frequency of the second low-frequency filter may be determined based on a downscaling ratio of the input image.

A filter for detecting a pattern may include a first pattern filter for detecting a first type pattern and a second pattern filter for detecting a second type pattern. In this case, in the operation S1710, the input image may be identified as a plurality of areas based on a first output value acquired by applying a first pattern filter to the input image and a second output value acquired by applying a second pattern filter to the input image. Here, a pattern period corresponding to the second type pattern may be greater than a pattern period corresponding to the first type pattern.

In operation S1710, based on a sum of the first output value and the second output value, the input image may be identified as a first area having a pattern inclusion probability equal to or greater than a threshold value and a second area having a pattern inclusion probability lower than the threshold value.

In operation S1710, the input image may be identified as, based on the first output value and the second output value, a third area in which the inclusion probability of the first type pattern is equal to or greater than the threshold value, a fourth area in which the inclusion probability of the second type pattern is equal to or greater than the threshold value, and a fifth area in which a probability of including the pattern is less than a threshold value, and apply the first low-frequency filter to the third area, the second low-frequency filter to the fifth area, and the third low-frequency filter to the fourth area. Here, the cut-off frequency of the third low-frequency filter may be higher than the cut-off frequency of the first low-frequency filter and lower than the cut-off frequency of the second low-frequency filter.

Operation S1720 may include obtaining a downscaled first image by applying a first low-frequency filter to the input image and obtaining a downscaled second image by applying a second low-frequency filter to the input image, obtaining weights for identifying a plurality of areas by applying a filter for pattern detection to the input image, applying the weights acquired to the downscaled first image, obtaining a downscaled image by applying another weight acquired based on the acquired weight to the downscaled second image.

In addition, the obtaining of the weight may include obtaining a plurality of output values by applying a plurality of filters for detecting a plurality of type patterns to the input image, summing the plurality of output values, and normalizing to obtain the weights.

In operation S1730, the downscaled image may be displayed.

According to the above-described various example embodiments, it may downscale the image using different low-frequency filters by detecting the presence or absence of a pattern for each area in the input image. Accordingly, it may prevent and/or reduce the remaining area from being blurred while preventing and/or reducing aliasing of the pattern area.

Various example embodiments of the disclosure may be applied to all electronic apparatuses capable of image processing, such as an image receiving device such as, for example, and without limitation, a set-top box, and a display device such as a TV, as well as an electronic apparatus.

The methods according to the above-described example embodiments may be realized as applications that may be installed in the existing electronic apparatus. The above-described methods according to various example embodiments of the disclosure may be performed using a deep learning-based artificial neural network (or deep artificial neural network), that is, a learning network model.

The methods according to the above-described example embodiments may be realized by upgrading the software or hardware of the existing electronic apparatus.

The above-described example embodiments may be executed through an embedded server in the electronic apparatus or through an external server outside the electronic apparatus.

According to an embodiment, the various embodiments described above may be implemented as software including instructions stored in a machine-readable storage media which is readable by a machine (e.g., a computer). The device may include the electronic apparatus according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated by a compiler or code executable by an interpreter. The machine-readable storage media may be provided in a form of a non-transitory storage media. The 'non-transitory' storage media does not include a signal and is tangible, but does not distinguish whether data is stored semi-permanently or temporarily in the storage media.

According to an embodiment, the methods according to the various embodiments may be provided as a part of the computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a part of the computer program product may be at least temporarily stored or provisionally generated on the storage media such as a manufacturer's server, the application store's server, or a memory in a relay server.

Further, each of the components (e.g., modules or programs) according to the various embodiments described above may include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various example embodiments, may be sequential, parallel, or both, executed iteratively or heuristically, or at least some operations may be performed in a different order, omitted, or other operations may be added.

While the disclosure has been illustrated and described with reference to various example embodiments, it will be understood that the various example embodiments are intended to be illustrative, not limiting. It will be further understood by those skilled in the art that various alternatives, modifications, and variations may be made without departing from the true spirit and full scope of the disclosure, including the appended claims and their equivalents.

What is claimed is:

1. An electronic apparatus configured to perform downscaling comprising:
   a memory storing an input image; and
   at least one processor configured to:
   apply a filter to the input image to identify the input image as a plurality of areas,
   apply a first low-frequency filter to a first area among the plurality of areas, and
   apply a second low-frequency filter to a second area among the plurality of areas,
   wherein a cut-off frequency of the second low-frequency filter is higher than a cut-off frequency of the first low-frequency filter,
   wherein at least one of the cut-off frequency of the first low-frequency filter and the cut-off frequency of the second low-frequency filter is determined based on a downscaling ratio with respect to the input image.

2. The apparatus of claim 1,
wherein the filter includes a first pattern filter configured to detect a first type pattern and a second pattern filter configured to detect a second type pattern, and
wherein the at least one processor is configured to identify the input image as a plurality of areas based on a first output value acquired by applying the first pattern filter to the input image and a second output value acquired by applying the second pattern filter to the input image.

3. The apparatus of claim 2,
wherein the at least one processor is configured to: based on a sum of the first output value and the second output value, identify the input image as the first area in which a pattern inclusion probability is greater than or equal to a threshold value, and the second area in which the pattern inclusion probability is less than the threshold value.

4. The apparatus of claim 3,
wherein the at least one processor is configured to: based on the first output value and the second output value, identify the input image as a third area in which an inclusion probability of the first type is greater than or equal to the threshold value, a fourth area in which an inclusion probability of the second type is greater than or equal to the threshold value, and a fifth area in which a pattern inclusion probability is less than the threshold value,
apply the first low-frequency filter to the third area, apply the second low-frequency filter to the fifth area, and apply a third low-frequency filter to remove a high-frequency component greater than or equal to a third threshold frequency to the fourth area,
wherein a cut-off frequency of the third low-frequency filter is higher than the cut-off frequency of the first low-frequency filter and lower than the cut-off frequency of the second low-frequency filter.

5. The apparatus of claim 2,
wherein a pattern period corresponding to the second type pattern is greater than a pattern period corresponding to the first type pattern.

6. The apparatus of claim 1, further comprising:
a display,
wherein the at least one processor is configured to control the display to display a downscaled image acquired based on the filtered first area and the filtered second area.

7. The apparatus of claim 6,
wherein the display comprises a plurality of display modules, each including a display.

8. An electronic apparatus configured to perform downscaling comprising:
a memory storing an input image; and
at least one processor configured to:
apply a filter to the input image to identify the input image as a plurality of areas,
apply a first low-frequency filter to a first area among the plurality of areas of the input image to acquire a downscaled first image,
apply a second low-frequency filter to a second area among the plurality of areas of the input image to acquire a downscaled second image,
apply a pattern detection filter to the input image to acquire a weight value for identifying the plurality of areas, and
apply the acquired weight value to the downscaled first image and apply another weight value acquired based on the acquired weight value to the downscaled second image to acquire the downscaled image,
wherein a cut-off frequency of the second low-frequency filter is higher than a cut-off frequency of the first low-frequency filter.

9. The apparatus of claim 8,
wherein the at least one processor is configured to:
apply a plurality of filters configured to detect a plurality of type patterns to the input image to acquire a plurality of output values, and
sum the plurality of output values and normalize to acquire the weight value.

10. The apparatus of claim 8,
wherein the acquired weight value w has a value of $0 \leq w \leq 1$, and
the another weight value is configured to be calculated as $1-w$.

11. The apparatus of claim 1,
wherein the at least one processor is configured to:
apply the first low-frequency filter to the input image to acquire a downscaled first image,
apply the second low-frequency filter to the input image to acquire a downscaled second image,
apply a third low-frequency filter to the input image to acquire a downscaled third image,
apply a pattern detection filter to the input image to acquire a first weight value, a second weigh value, and a third weight value for identifying the plurality of areas, and
apply the first weight value to the downscaled first image, apply the second weight value to the downscaled second image, and the third weight value to the downscaled third image to acquire the downscaled image.

12. The apparatus of claim 11,
wherein a sum of the first weight, the second weight, and the third weight is 1.

13. An image processing method of an electronic apparatus to perform downscaling comprising:
applying a filter to an input image to identify the input image as a plurality of areas;
applying a first low-frequency filter to a first area among the plurality of areas; and
applying a second low-frequency filter to a second area among the plurality of areas; and
displaying a downscaled image acquired based on the filtered first area and the filtered second area,
wherein a cut-off frequency of the second low-frequency filter is higher than a cut-off frequency of the first low-frequency filter,
wherein at least one of the cut-off frequency of the first low-frequency filter and the cut-off frequency of the second low-frequency filter is determined based on a downscaling ratio with respect to the input image.

14. The method of claim 13,
wherein the filter is configured to include a first pattern filter configured to detect a first type pattern and a second pattern filter configured to detect a second type pattern, and
wherein the identifying the input image as the plurality of areas includes identifying the input image as a plurality of areas based on a first output value acquired by applying the first pattern filter to the input image and a second output value acquired by applying the second pattern filter to the input image.

15. The method of claim 14, further comprising:
based on a sum of the first output value and the second output value, identifying the input image as the first area in which a pattern inclusion probability is greater than or equal to a threshold value, and the second area in which the pattern inclusion probability is less than the threshold value.

16. The method of claim 15, further comprising:
based on the first output value and the second output value, identifying the input image as a third area in which an inclusion probability of the first type is greater than or equal to the threshold value, a fourth area in which an inclusion probability of the second type is greater than or equal to the threshold value, and a fifth area in which a pattern inclusion probability is less than the threshold value,
applying the first low-frequency filter to the third area, apply the second low-frequency filter to the fifth area, and apply a third low-frequency filter to remove a high-frequency component greater than or equal to a third threshold frequency to the fourth area,
wherein a cut-off frequency of the third low-frequency filter is higher than the cut-off frequency of the first low-frequency filter and lower than the cut-off frequency of the second low-frequency filter.

17. The method of claim 14, wherein a pattern period corresponding to the second type pattern is greater than a pattern period corresponding to the first type pattern.

18. An image processing method of an electronic apparatus to perform downscaling comprising:
applying a filter to an input image to identify the input image as a plurality of areas,
applying a first low-frequency filter to a first area among the plurality of areas of the input image to acquire a downscaled first image,
applying a second low-frequency filter to a second area among the plurality of areas of the input image to acquire a downscaled second image,
applying a pattern detection filter to the input image to acquire a weight value for identifying the plurality of areas,
applying the acquired weight value to the downscaled first image and apply another weight value acquired based on the acquired weight value to the downscaled second image to acquire the downscaled image, and
displaying the downscaled image,
wherein a cut-off frequency of the second low-frequency filter is higher than a cut-off frequency of the first low-frequency filter.

* * * * *